United States Patent [19]

Nakajima et al.

[11] Patent Number: 5,263,017
[45] Date of Patent: Nov. 16, 1993

[54] DIGITAL RADIO TRANSMISSION SYSTEM

[75] Inventors: Toshio Nakajima, Yokohama; Kazutoshi Kawamura, Chigasaki; Teruo Mizumoto, Kawasaki, all of Japan

[73] Assignee: Fujitsu Limited, Kawasaki, Japan

[21] Appl. No.: 835,083

[22] Filed: Feb. 18, 1992

Related U.S. Application Data

[63] Continuation of Ser. No. 496,007, Mar. 20, 1990, abandoned.

[30] Foreign Application Priority Data

| Mar. 20, 1989 [JP] | Japan | 1-69065 |
| Aug. 22, 1989 [JP] | Japan | 1-215602 |
| Aug. 23, 1989 [JP] | Japan | 1-217097 |

[51] Int. Cl.$^5$ ............................................... H04J 1/16
[52] U.S. Cl. .................................. 370/16; 370/55; 370/85.6; 340/827
[58] Field of Search ............... 370/55, 6, 84, 13, 112, 370/16, 85.6, 85.1, 85.5, 58.1; 371/11.1, 8.1, 22.2; 340/825.05, 825.5, 825.51, 825.52, 827, 825.01; 333/101

[56] References Cited

U.S. PATENT DOCUMENTS

| 4,393,492 | 7/1983 | Bishop | 370/55 |
| 4,434,484 | 2/1984 | Huffman et al. | 370/55 |
| 4,598,399 | 7/1986 | Bath | 370/55 |
| 4,716,561 | 12/1987 | Angell et al. | 370/55 |
| 4,747,097 | 5/1988 | Ohya et al. | 370/16 |
| 4,759,009 | 7/1988 | Casady et al. | 370/55 |
| 4,811,021 | 3/1989 | Yoshimota et al. | 370/6 |
| 4,881,220 | 11/1989 | Yomogida et al. | 370/16 |
| 4,984,233 | 1/1991 | Nakayashiki et al. | 370/16 |

FOREIGN PATENT DOCUMENTS

| 0142138 | 5/1985 | European Pat. Off. |
| 0306970 | 3/1989 | European Pat. Off. |
| 62-026944 | 7/1987 | Japan |

*Primary Examiner*—Douglas W. Olms
*Assistant Examiner*—Dang Ton
*Attorney, Agent, or Firm*—Staas & Halsey

[57] ABSTRACT

A digital radio transmission system having a first terminal office (10), a second terminal office (20) and at least one drop/insertion (DI) office (30) located therebetween. Long distance lines between the first and second terminal offices are handled in the DI office together with first and short distance lines each being replaced by first and second protection lines, respectively. A protection line for the long distance lines is realized by commonly using the first and second protection lines inherently allotted to the first and second short distance lines. Further the line switching, due to a fault in the long distance line, from the faulty long distance line to the both the first and second short line side protection lines can be achieved by communicating a particular line switching control signal among all the offices.

17 Claims, 27 Drawing Sheets

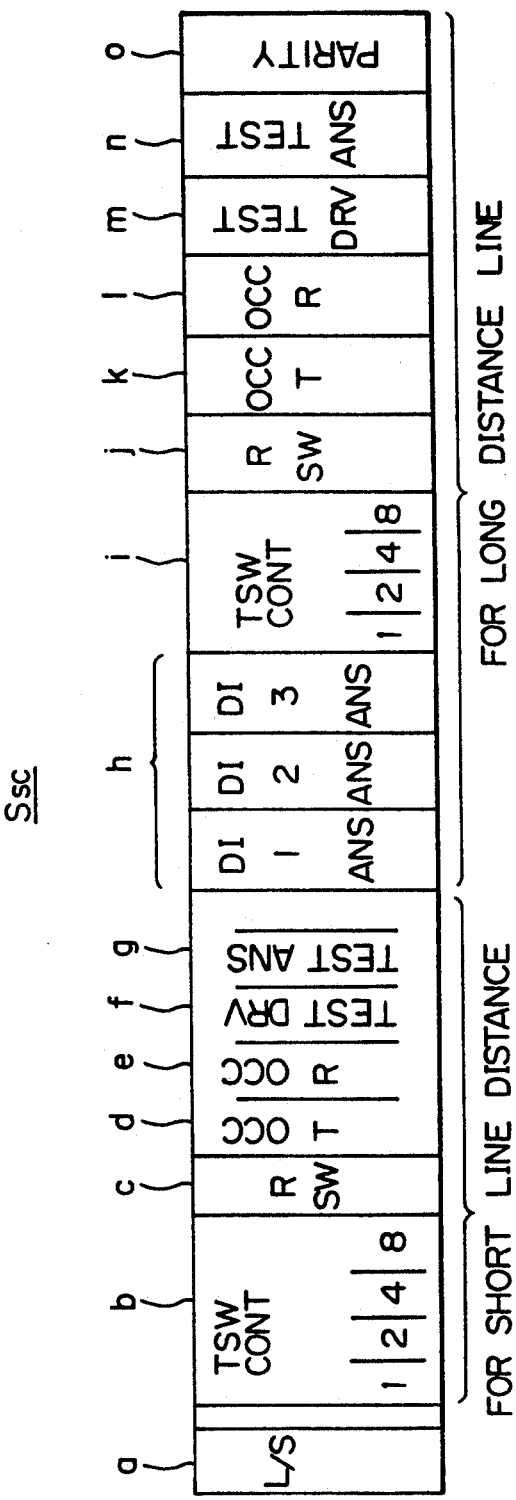

| Fig.10A | Fig.10B |

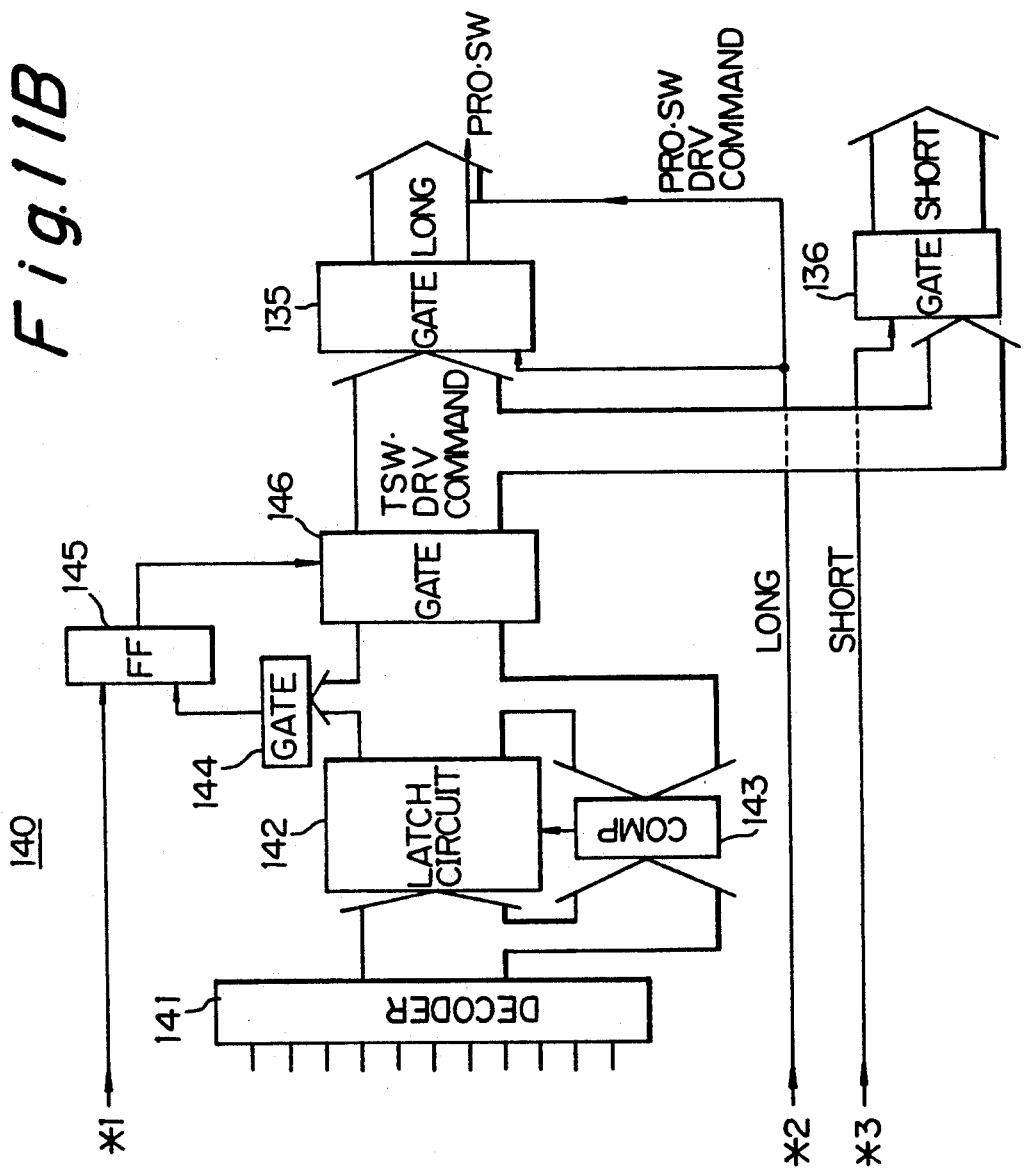

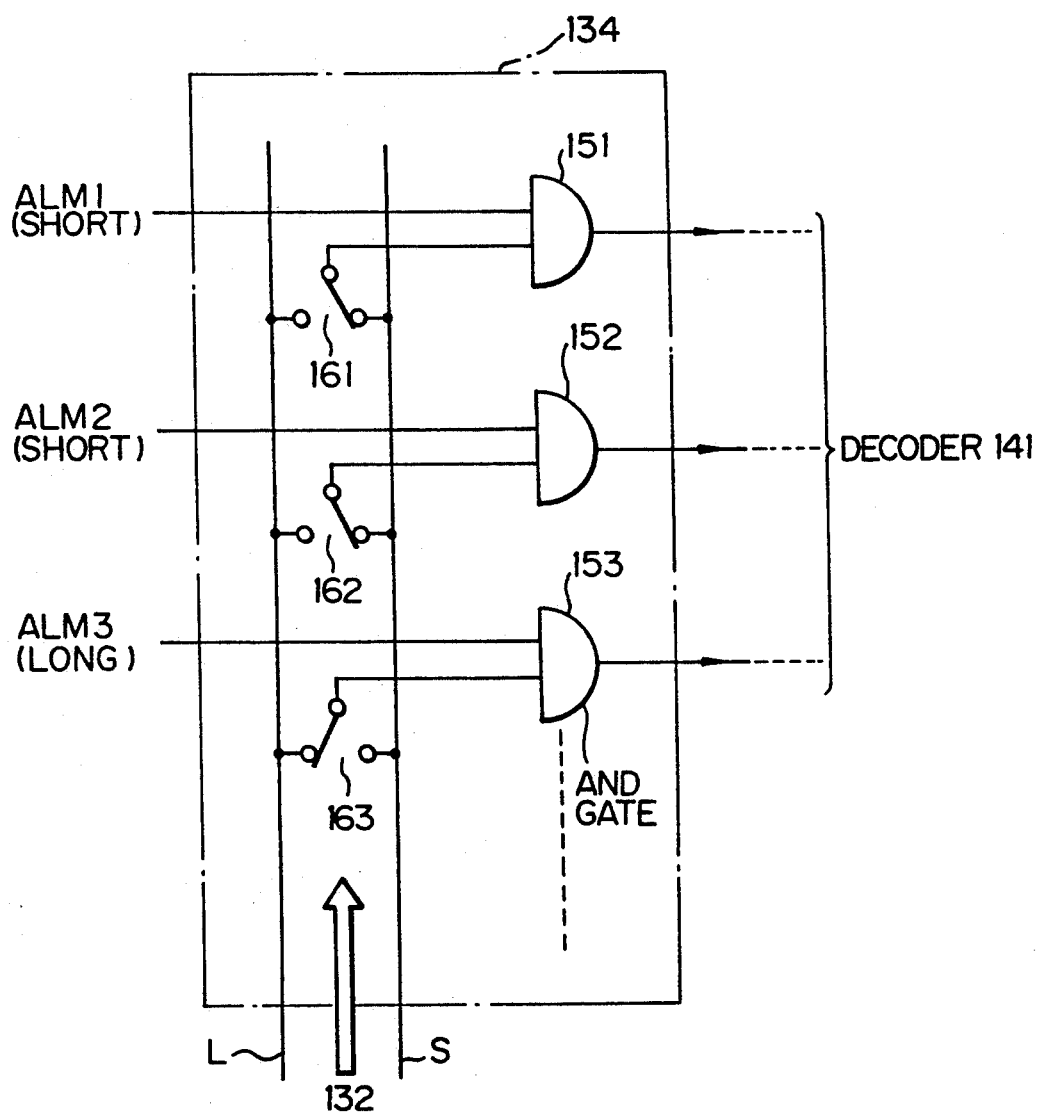

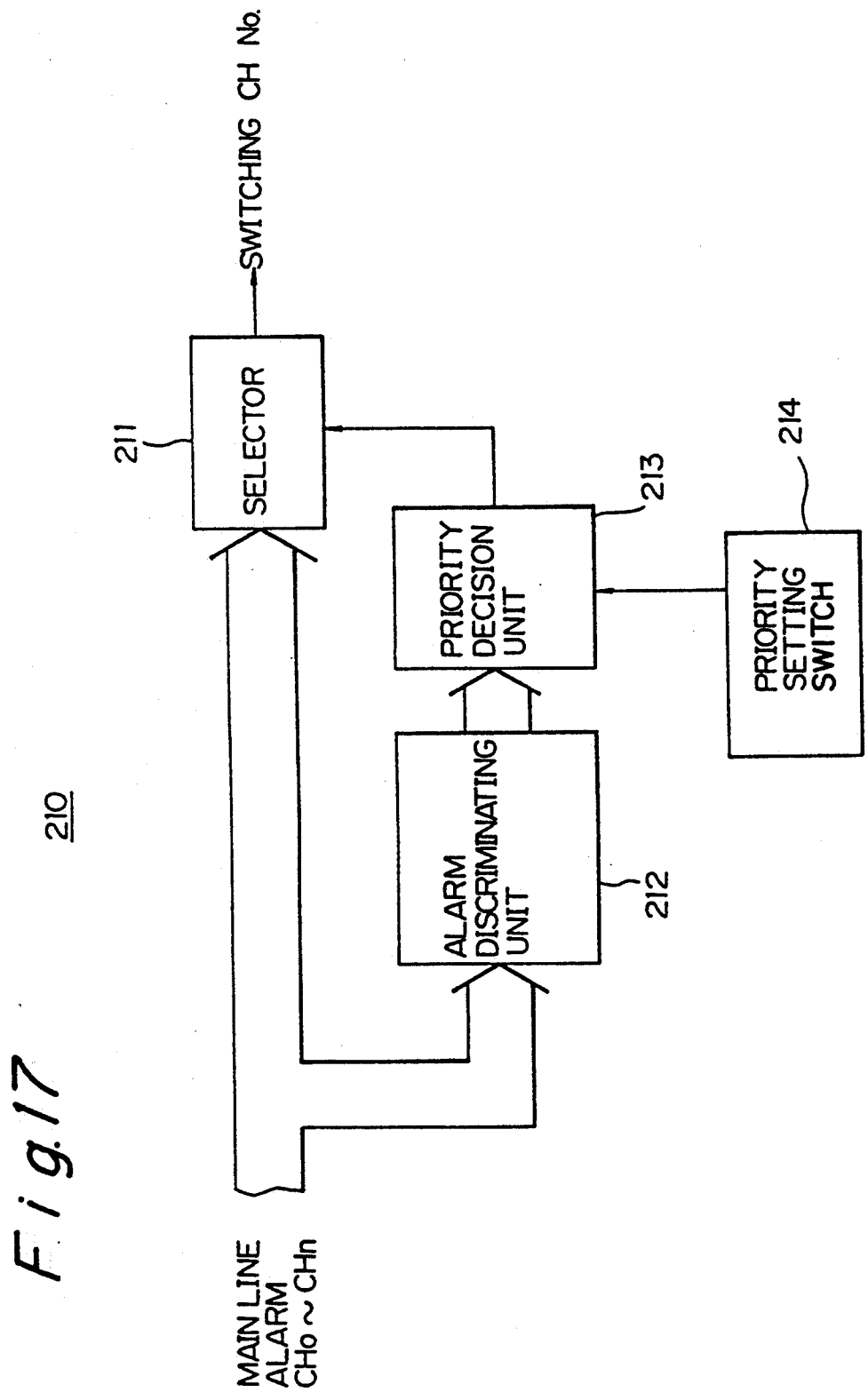

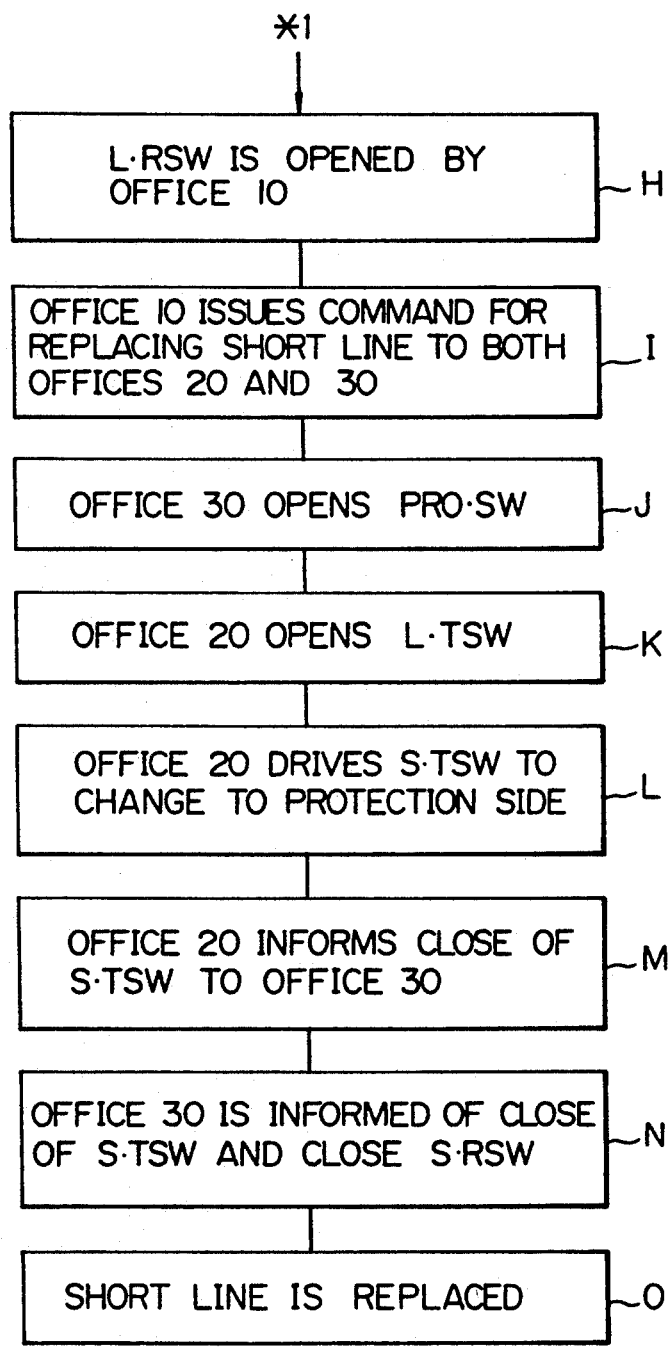

DIGITAL RADIO TRANSMISSION SYSTEM

This application is a continuation of application Ser. No. 07/496,007, filed Mar. 20, 1990, now abandoned.

BACKGROUND OF THE INVENTION

1. Field of the Invention

The present invention relates to a digital radio transmission system constituting a first terminal office, a second terminal office, and at least one drop/insertion office located therebetween, and more particularly a system which includes means for effectively performing line switching from a main line to a protection line when a fault occurs in one of the main lines.

In a digital and large capacity transmission system, a drop/insertion office is required to drop and insert transmission signals with respect to a local transmission system.

Usually a plurality of drop/insertion offices are employed in the digital radio transmission system, and therefore there is a high probability that various faults will occur in the system. Accordingly, it is required to recover from each fault quickly by effectively achieving the line switching from the main line side to the protection line side.

2. Description of the related Art

As explained hereinafter in detail, a prior art digital radio transmission system raises at least the following three problems related to the line switching.

(1) In the prior art digital radio transmission system, the line switching from the main side to the protection side is achieved at respective sections separately, i.e., between the first office and a first intermediate end office and between the second office and a second intermediate end office. In this case, the intermediate end offices comprising each drop/insertion office are usually separated from each other, and therefore, if a long distance line is formed between the first and second terminal offices, it is impossible to achieve the line switching from the faulty long distance line to the protection line unless the protection line is newly introduced in the system privately only for the long distance line.

(2) It may be possible to carry out the aforesaid drop and insertion for a part of the main lines, if the terminal office is used to serve as a repeater office, at the repeater office. In this case, the overall system becomes large and high in cost, since switching equipment (SW) and carrier-frequency terminal equipment (MUX) for the relay lines in the repeater office are usually large in size and expensive.

(3) It would be possible to realize the drop/insertion without using a repeater office. However this measure is not practical, since such a system requires complicated line control, and thus the system cannot be built at low cost.

SUMMARY OF THE INVENTION

Accordingly, it is an object of the present invention to provide, in the digital radio transmission system having the drop/insertion offices, means for realizing the related line switching without employing a protection line privately used by the long distance lines only, without reducing the line switching speed and increasing the cost.

To attain the above object, according to the present invention, the long distance lines between the first and second terminal offices are accommodated inside each drop/insertion office together with the short distance lines. The short distance lines are handled by a drop/insertion processing unit in each drop/insertion unit, but the long distance lines are distributed without passing through the drop/insertion unit. When a fault occurs in one of the long distance lines, the faulty line is bypassed to the protection lines which are inherently serving as the short distance lines only, so that the faulty long distance line can be replaced thereby. In this case, priority decision means is employed to manage a conflict between a faulty long line and a faulty short line when both exist simultaneously.

Further, a particular line switching control signal communicates through the offices to achieve quick line switching.

BRIEF DESCRIPTION OF THE DRAWINGS

The above object and features of the present invention will be more apparent from the following description of the preferred embodiments with reference to the accompanying drawings, wherein:

FIG. 7 illustrates the relationship between FIGS. 7A and 7B;

FIG. 8 depicts a data format of a line switching control signal communicating among the first terminal, intermediate end and second terminal offices;

FIGS. 11A and 11B are circuit diagrams showing the specific construction of the switching logic unit;

FIG. 12 is a circuit diagram of an example of an inhibit circuit;

FIG. 17 is a block digram of an example of the L/S priority setting unit;

FIG. 18 illustrates the arrangement of FIGS. 18A, 18B;

FIGS. 19A and 19B are flow charts for processing double faults occurring in the long side and short side lines;

DESCRIPTION OF THE PREFERRED EMBODIMENTS

Before describing the embodiments of the present invention, the related art and the disadvantages therein will be described with reference to the related figures.

Figure 1:
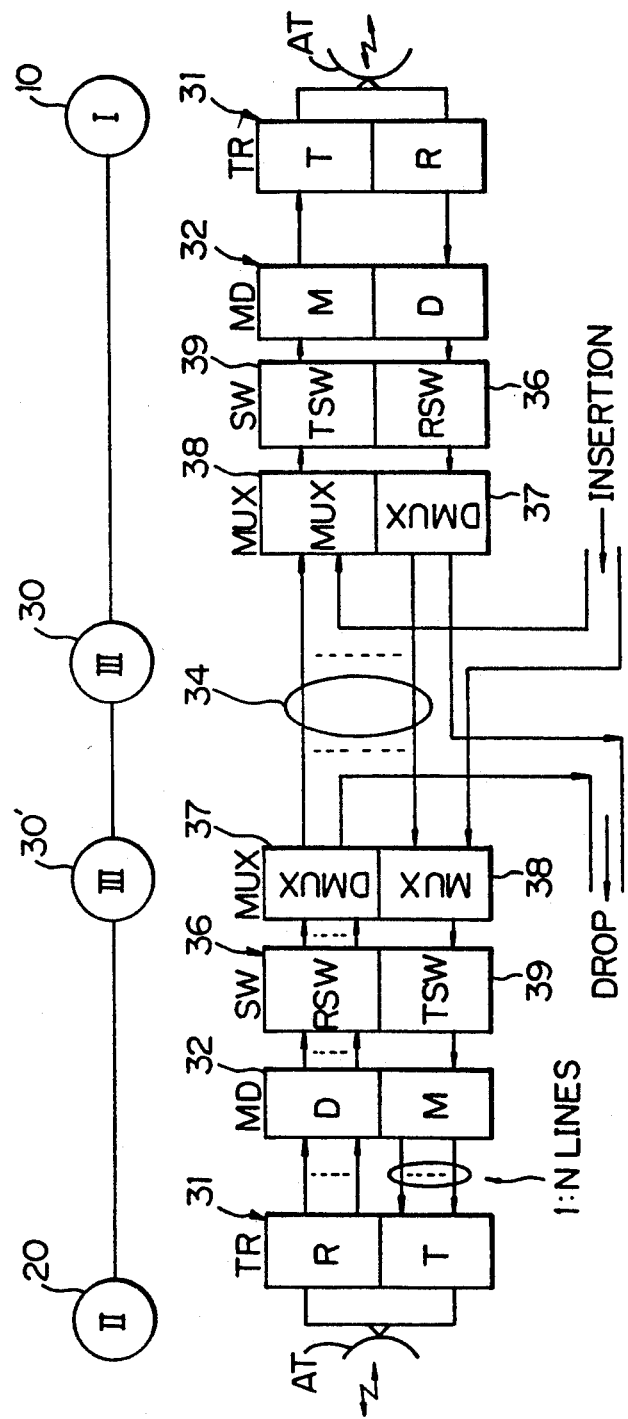
FIG. 1 illustrates a digital radio transmission system simply based on the prior art system of FIG. 2.
Figure 2:
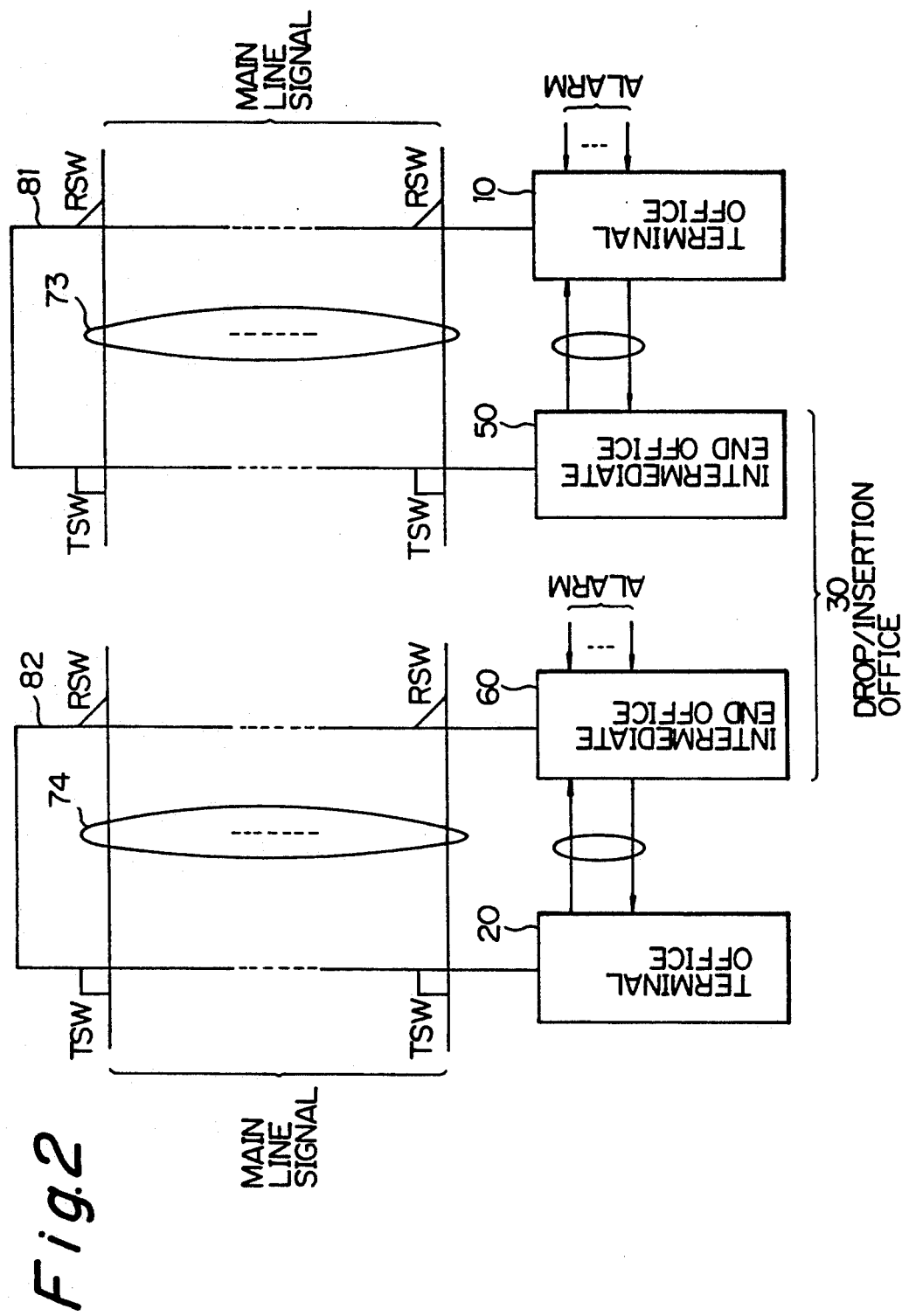
FIG. 2 illustrates a prior art digital radio transmission system.

FIG. 1 illustrates a digital radio transmission system simply based on the prior art system of FIG. 2. In FIG. 1, 31 denotes a transmitter/receiver (TR) unit, 32 a radio modulator/demodulator (MD) unit, 36 a transmitting-end switch (TSW), 39 a receiving-end switch (RSW), 37 a demultiplexer (DMUX) and 38 a multiplexer (MUX).

In the prior art, the drop and insertion are performed by the use of repeaters for communicating with local transmission systems. The drop and insertion are applied only for required lines, for example, telephone lines The transmission signal from the second terminal office 20 to the intermediate end office 30' is relayed at intermediate end offices 30' and 30 and then sent to the first terminal office 10. In this case, at the offices 30 and 30', the transmission signal is received at the receiver of the TR unit 31, demodulated at the demodulator of the MD unit 32, and applied to the demultiplexer 37 of the MUX unit via the receiving-end switch 36 of the SW unit. At the demultiplexer 37, a part of the received transmission signal is dropped to the local end and the remaining transmission signal still travels through a relay line 34 and is output to the right side antenna AT via the multiplexer 38, the switch (TSW) 39, the modulator of the MD unit 32 and the transmitter (T) of the TR unit 31, and thus transmitted to the first terminal office 10.

The reverse direction transmission signal is also transferred from the office 10 to the office 20 through the offices 30 and 30' in a reverse order to that mentioned above. During the transmission, a part of the transmission signals is dropped.

The transmission signals from the local end are inserted at the multiplexers 38 and then sent to the offices 10 and 20.

The system of FIG. 1 produces the aforesaid problems, especially the problems (2) and (3).

FIG. 2 illustrates a prior art system digital radio transmission system. It should be understood that identical members are indicated by the same reference numerals and characters throughout the drawings. In FIG. 2, during a usual operation, the main line signals are communicated between the first office 10 and the first intermediate end office 50, and also between the second office 20 and the second intermediate end office 60, separately from each other. The intermediate end offices 50 and 60 carry out the drop and insertion of the transmission signals with respect to the local ends and form a drop/insertion (DI) office. Here, the offices 50 and 60 are independent from each other.

Assuming that some fault occurs in the main line (73, 74), the related alarm signal is received by, for example, the first terminal office 10. The office 10 operates to send a parallel transmission control signal to the office 50 so as to occupy the first protection line 81 in parallel with the faulty main short distance line 73. This also applies for the second protection line 82 in the case where a fault occurs in one of the second short distance lines 74.

Figure 3:
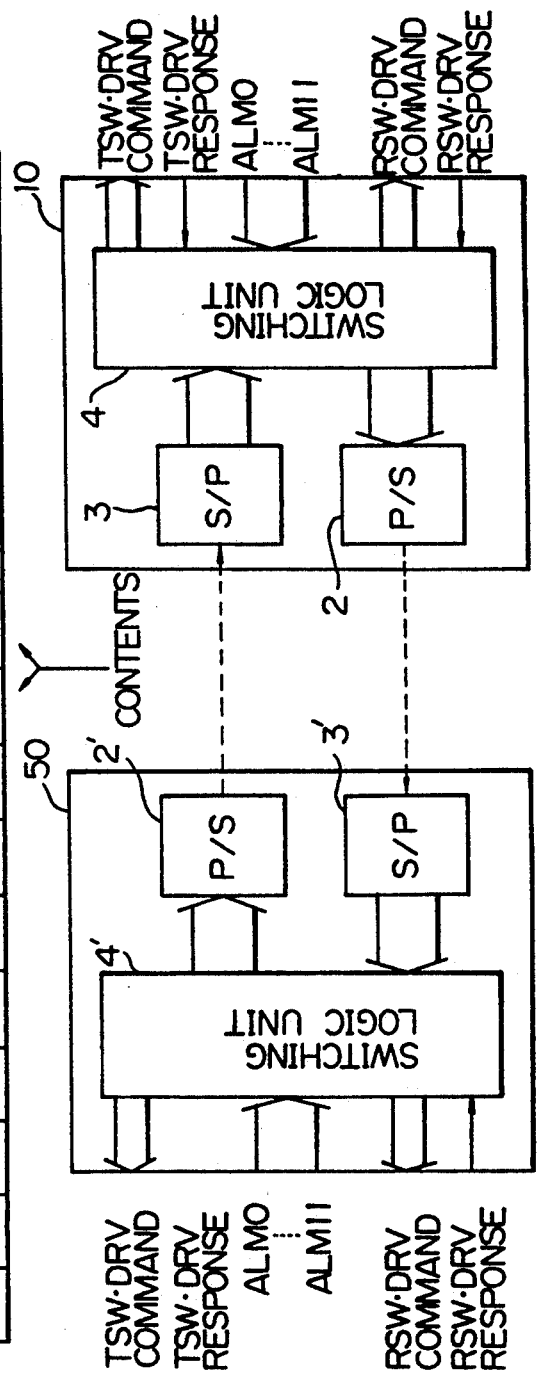
FIG. 3 illustrates a terminal office and an intermediate end office facing it as shown in FIG. 2, together with a control signal communicating therebetween.

FIG. 3 illustrates a terminal office and an intermediate end office facing it as shown in FIG. 2, together with a control signal communicated therebetween Due to the occurrence of a fault, the first office 10 is sent one of alarm signals ALM0 through ALM11. A switching logic unit 4 operates to insert, in the line switching control signal at its bits 1 through 4 shown at the upper half in FIG. 3, a command to drive (DRV.COMMAND) the transmitting-end switch (TSW) in the office 50 corresponding to the faulty line, and transmit the signal to the office 50 via a parallel/serial (P/S) converting circuit 2. Incidentally, the alarm detection can be made by, for example, a well-known "MD switch" mounted in the modulator/demodulator unit panel.

The office 50 receives, via a serial/parallel (S/P) converting circuit 31, the line switching control signal generated in the switching processing unit 4, and then decodes the received signal at its switching processing unit 4'. The thus decoded TSW.DRV (FIG. 2) command is supplied to the TSW corresponding to the alarm signal.

The TSW receiving the above-mentioned DRV command returns a response signal responding to this command. The unit 4' in the office 50 generates, when receiving the response signal, the line switching control signal shown in the upper half of FIG. 3. In the thus generated signal, the bits 5 through 8 are specified as to which bits indicate a drive (DRV) command for driving the corresponding receiving-end switch in the office 10. The signal containing the DRV command is transmitted, via a P/S converting circuit 2', to the office 10.

The offices 10 receives the thus transmitted signal via a S/P converting circuit 3 and decodes the same from its bit 5 through bit 8 in the switching logic unit 4, so that the DRV command is given to the corresponding receiving-end switch (RSW).

Figure 4:
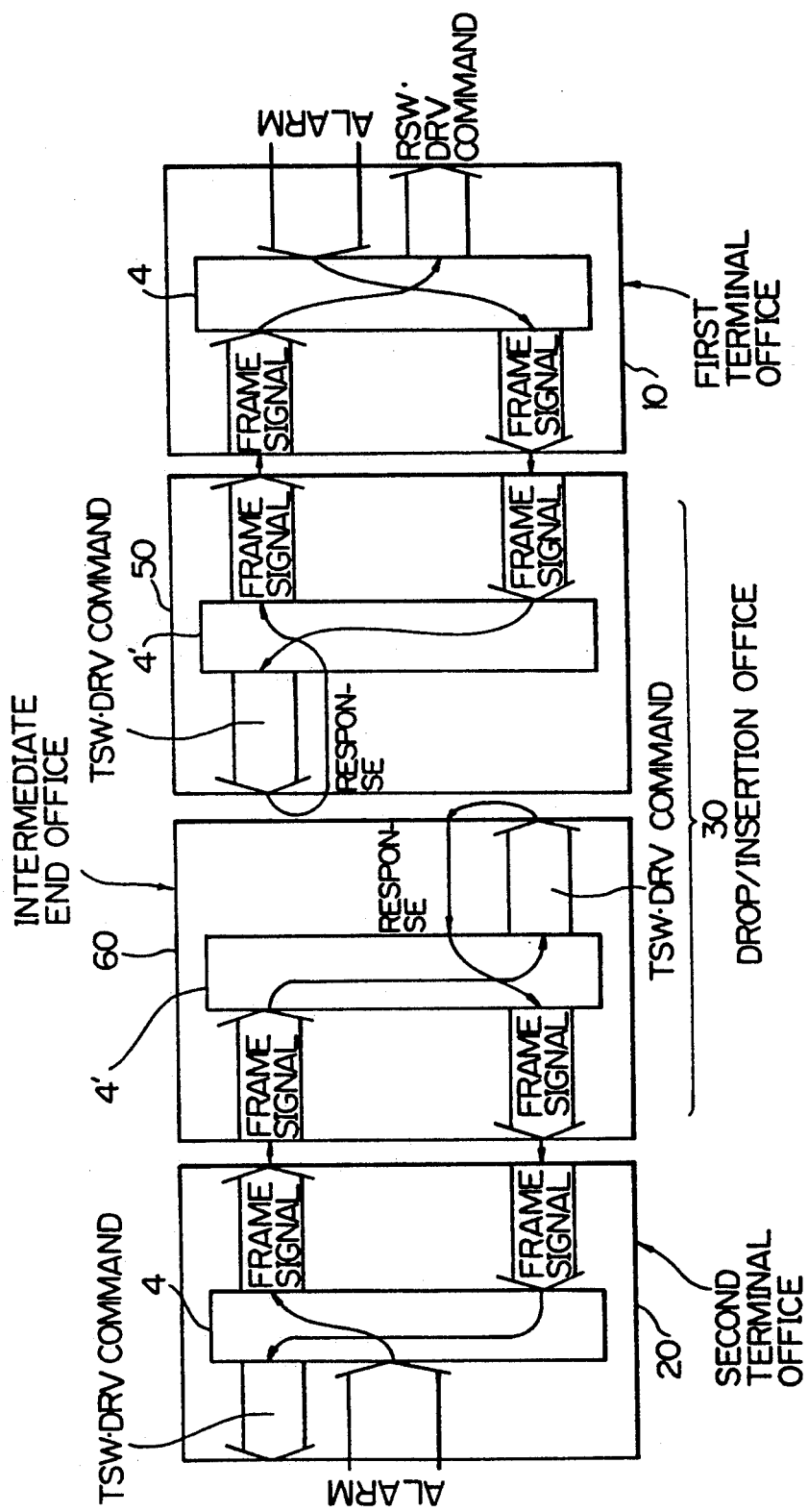
FIG. 4 depicts a control signal flow in the prior art system.

FIG. 4 depicts a control signal flow in the prior art system. The above explained procedure of the line switching can be understood with reference to FIG. 4. That is, the line switching is carried out at the sections between the offices 10 and 50 and between the office 20 and 60 independently, as mentioned before with reference to FIG. 2.

According to the aforesaid explanation of FIGS. 2 through 4, the reason for the previously recited problem (1), among the problems (1) through (3), can be well understood.

Figure 5:
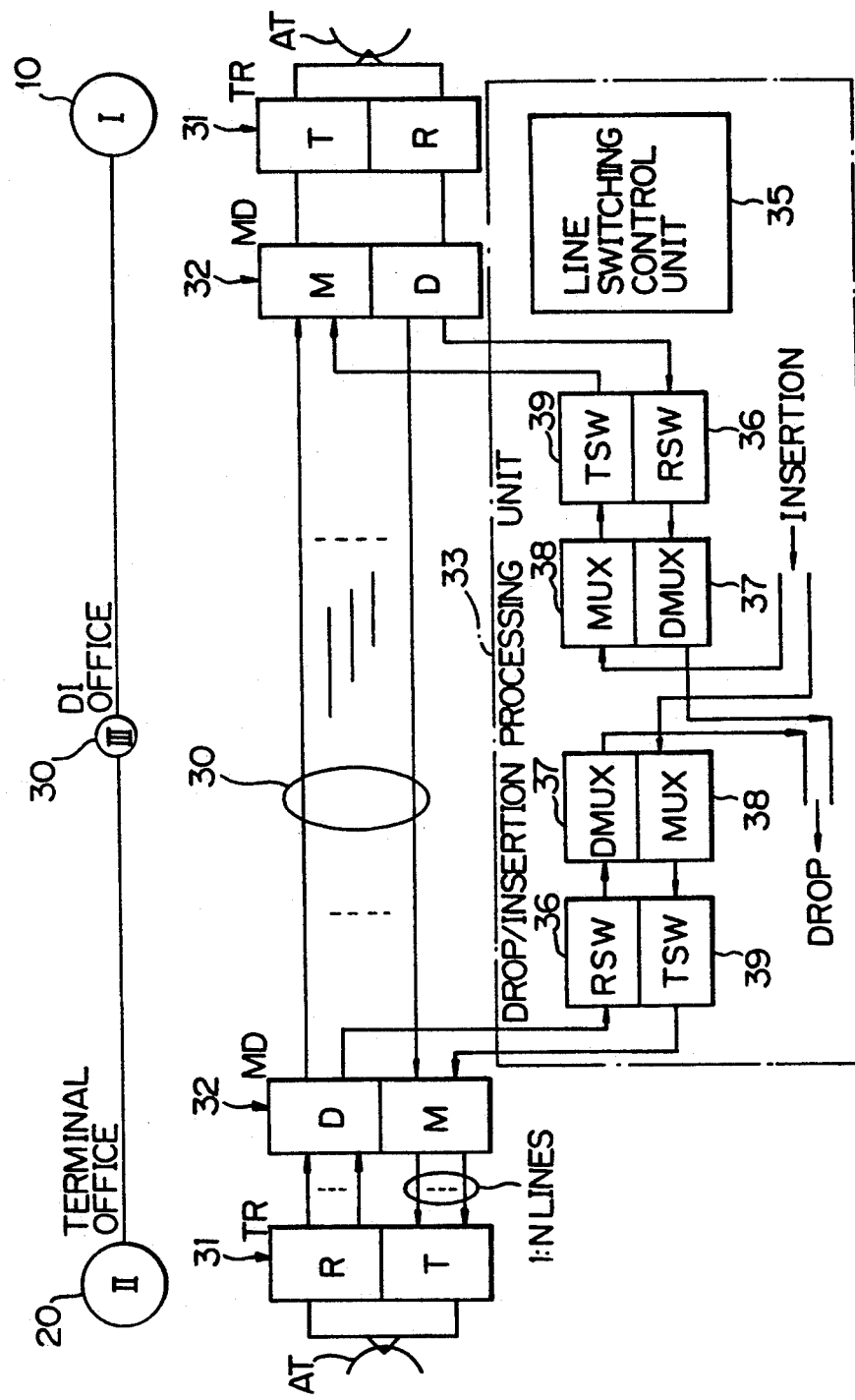
FIG. 5 is a block diagram showing a principle of a digital radio transmission system according to a first embodiment of the present invention.

FIG. 5 is a block diagram showing a principle of a digital radio transmission system according to a first embodiment of the present invention. In the figure, at least one intermediate end office 30 is located between the first terminal office 10 and the second terminal office 20. Each of the intermediate end offices 30 is called a drop/insertion (DI) office. These offices 10, 20 and 30 constitute a digital radio transmission system of N vs 1 lines, i.e., which has a plurality of N main lines and one protection line.

In the D/I office, i.e., the intermediate end office 30, the data received, via an antenna AT, at the radio transmitter/receiver (TR) unit 31 is then demodulated at the radio modulator/demodulator (MD) unit 32.

At this time, a required line or lines are drawn into a drop/insertion processing means, i.e., a drop/insertion processing (DIP) unit 33, which achieves a drop of transmission signals. The remaining lines, other than the thus dropped lines, are treated as relay lines and then modulated again in the other radio modulator/demodulator (MD) 32 to transmit the data via the other transmitter/receiver (TR) unit 31 and the other antenna AT.

Further the data to be inserted from the DI office 30 is applied to known carrier-frequency terminal equipment and then transmitted to the opposite office.

In the DI office 30, a fault occurring in the short distance line can be replaced by a usual switching means. Here the short distance lines are distributed between the DI office and the opposite terminal office and also between the two adjacent DI offices if a plurality of the DI offices exist.

On the other hand, a faulty long distance line between the first and second terminal offices 10 and 20 is replaced as follows by the use of the protection lines being provided by each DI office.

Assuming that the first terminal office 10 detects an occurrence of a fault between the first and second terminal offices 10 and 20, a first line switching control means 11 (see FIG. 7B) in the first terminal office 10 operates to confirm the conditions of an occupation status and an alarm status regarding the protection line from the first terminal office 10 to the DI office (10→30). If it is confirmed that the protection line (10→30) is not being occupied and is normal, a line switching control signal ($S_{sc}$) is sent from the office 10.

The DI office 30, receiving the line switching control signal ($S_{sc}$), detects, at its line switching control means 35, the occurrence of the fault on the long distance line. The line switching control means 35 then confirms the status of the protection line preceding the office 30 (30→10), and if it is confirmed that the protection line (30→10) is not occupied (non-use) and normal (no alarm), the office 30 sends the line switching control signal $S_{sc}$ to the first terminal office 10 (30→10).

At this time, a protection side switch in the office 30 is closed by the means 35 and the means 35 sends back a response signal from the protection side switch to the first terminal office 10 (30→10).

The second terminal office 20 receiving the line switching control signal $S_{sc}$ controls the related transmitting-end switch to perform a parallel transmission at the transmitting-end switch and, at the same time, sends a receiving-end switch control command as a line switching control signal $S_{sc}$ to the office 30 (10→30). Incidentally, when the above parallel transmission at the transmitting-end switch is performed, a pilot signal which is usually sent is stopped, and the main line signal is also branched to the protection line.

The DI office 30 receiving the line switching control signal $S_{sc}$ from the office 10, operates to relay the long distance line side information. Further, when the first terminal office 10 receives the signal $S_{sc}$ and confirms that the response signal from the DI office 30 has been given, the office 10 replaces the faulty main line to the protection line.

Thus, through the above procedure, the faulty main long distance line can be replaced by the protection line of the DI office 30. Incidentally, a member identical to the line switching control means 11 and 21 is also mounted inside the second terminal office 20 as a second line switching control means 21 (see FIG. 7).

As mentioned above, the problem, during a line switching control for the long distance line, is how the response signal from the protection side switch in the DI office 30 can be sent back to the receiving-end office (first office 10 in the above example) at high speed, can be satisfied by sending the response signal on a downstream line switching control signal which reaches the receiving-end office before the command (receiving-end switch drive command) from the sending-end office (office 20 in the above example) reaches the receiving-end office. This ensures a switching speed comparable with the switching speed attained in a usual line switching control between the first and second terminal offices where no DI offices exist therebetween. This will be further clarified with reference to FIG. 6.

In FIG. 5, reference numeral 36 denotes a receiving-end switch (RSW), 37 a demultiplexer (DMUX 38 a multiplexer (MUX) and 39 a transmitting-end switch (TSW).

Figure 6:
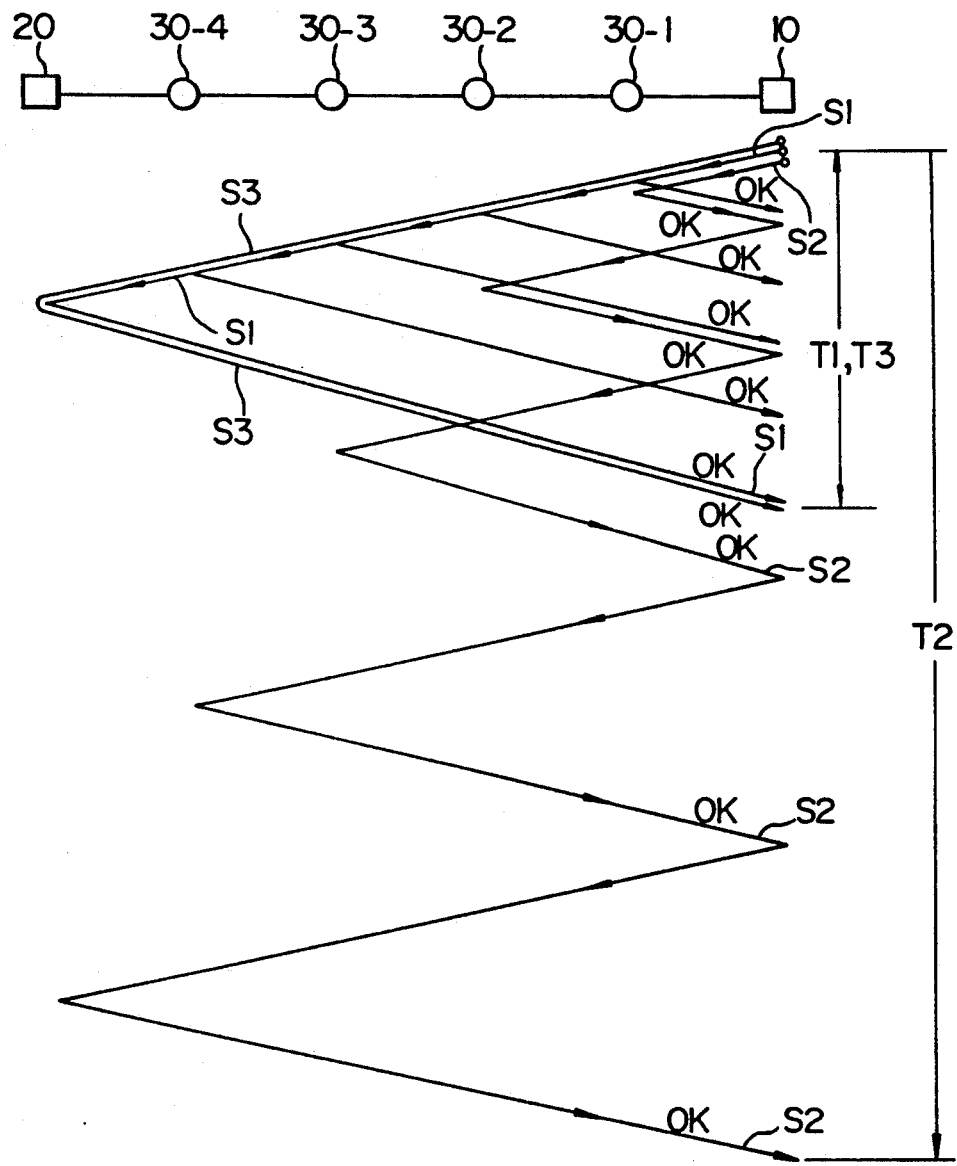
FIG. 6 schematically depicts an operational principle of the present invention.

FIG. 6 is a sequence chart for schematically depicting an operational principle of the present invention. In FIG. 6, the explanation is made by taking an example of a case where there are four DI offices 30 (30-1 through 30-4) connected in series between the first and second terminal offices 10 and 20. A sequence chart S1 represents the present invention, S2 represents a sequence chart which would be obtained under a line switching control easily made by a person skilled in the art, and S3 represents a sequence chart which is obtained under a line switching control in a typical system constructed by the first and second terminal offices only, i.e., no DI offices lying therebetween.

As seen from FIG. 6, in a case where a fault occurs in the long distance main line and is detected at the first office 10, the time from the above detection to a completion of the line switching is T1 under the sequence S1, T2 under S2, and T3 under S3. The time T1 is much shorter than the time T2 and is comparable with T3. This means that a high speed line switching can be obtained.

The specific construction of the digital radio transmission system according to the first embodiment will be explained below.

Figure 7A:
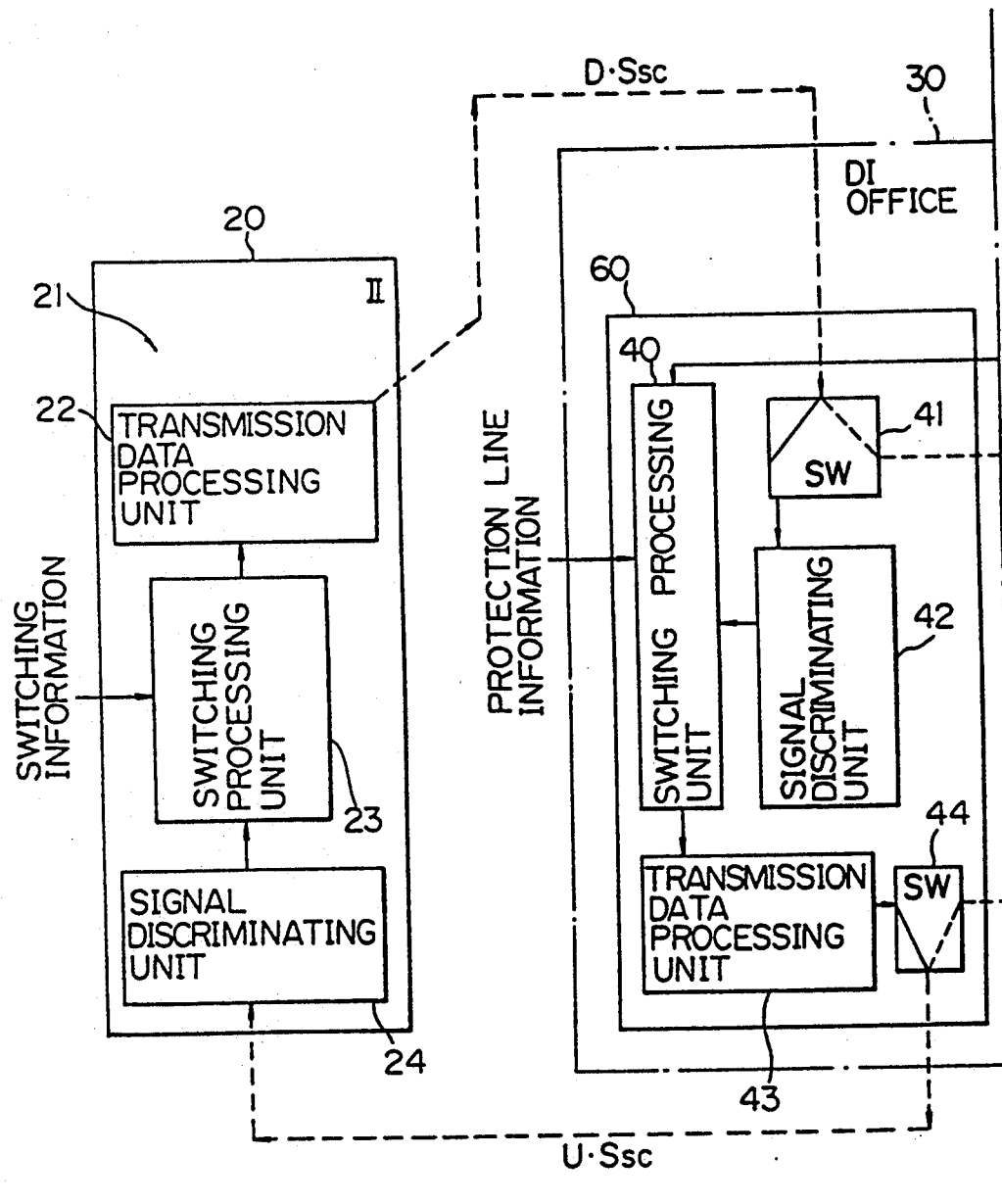
FIGS. 7A and 7B are block diagrams showing a specific construction according to a first embodiment of the present invention.
Figure 7B:
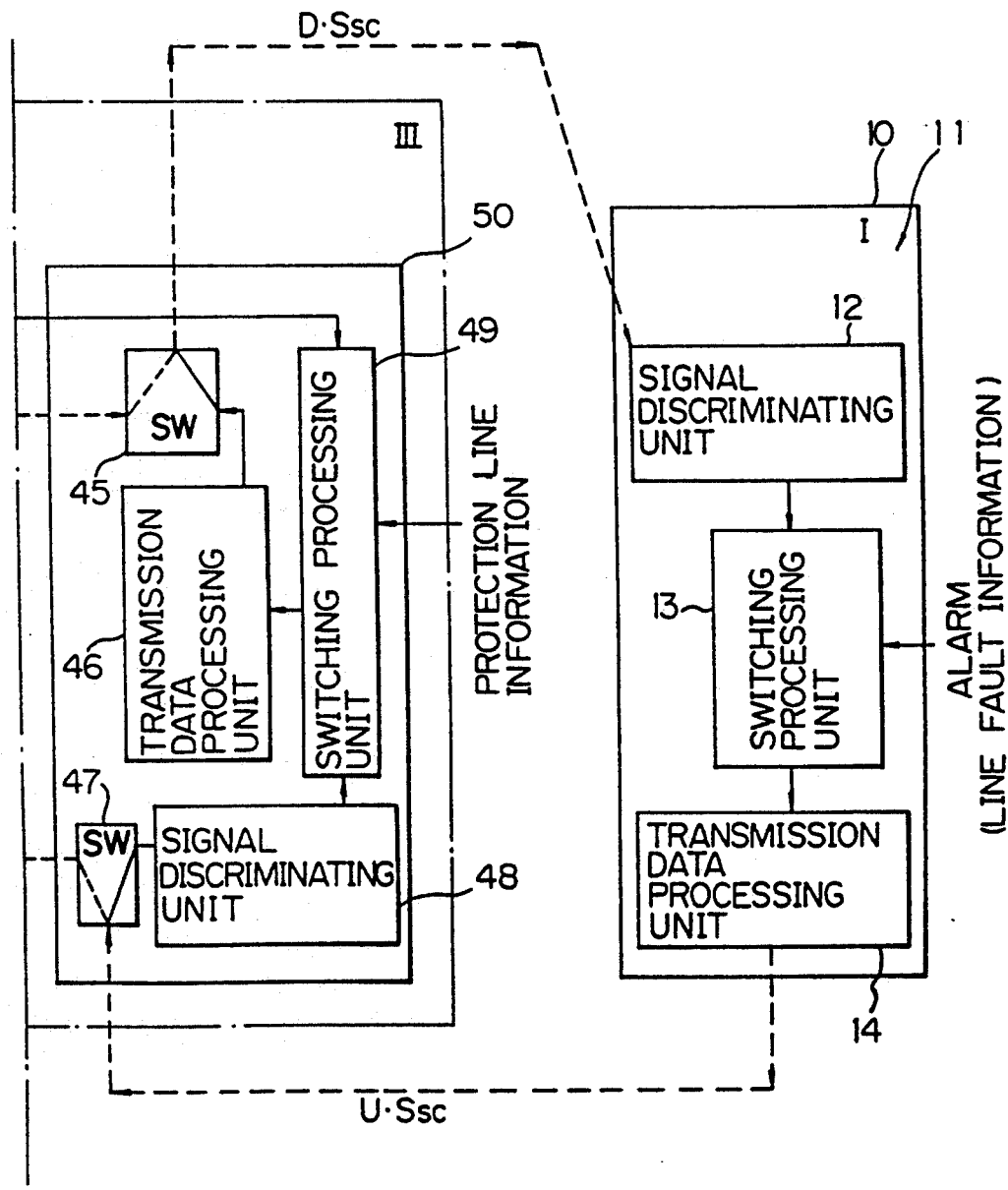

FIG. 7 (7A, 7B) is a block diagram showing a specific construction according to a first embodiment of the present invention, and FIG. 8 depicts a data format of a line switching control signal communication among the first terminal, intermediate end and second terminal offices.

The digital radio transmission system based on the present invention is operating in a digital mode and has a large scale line capacity. In the system, it is necessary to employ the drop/insertion office (DI office) to enable dropping and inserting the required lines selectively, at low cost, for a connection with small or medium scale local transmission systems.

In the above system, at least one DI office is located between the first and second terminal offices and a N vs 1 line switching means is incorporated therein. Further, as mentioned previously, in the DI office, a fault occurring in the short distance line can be replaced by a usual switching means. Here the short distance lines are distributed between the DI office and the opposite terminal office and also between the two adjacent DI offices if a plurality of the DI offices exist.

On the other hand, a faulty long distance line between the first and second terminal offices should be replaced by connecting the protection lines being provided by each DI office.

In this case, it is important to consider how fast and correctly the related line switching can be achieved in the DI office 30. This is due to a known fading phenomena peculiar to radio transmissions. The fading phenomena causes changes in conditions at a receiver side as quickly as about 100 dB/sec. Therefore it is necessary to follow the fading and replace a faulty long distance line as quickly as about 10 msec.

In the first embodiment, an explanation will be made using an example where only one DI office 30 is located, for brevity, between the first and second terminal offices 10 and 20.

Referring to FIG. 7, members mounted in the second terminal office 20 are a second transmission data processing unit 22, a second line switching processing unit 23 and a second signal discriminating unit 24. In the first terminal office 10, similar members to the above are mounted as members 12, 13, and 14.

Members mounted in the DI office 30 are line switching processing units 40, 49, line switching switches 41, 45, 44, 47, signal discriminating units 42, 48, and transmission data processing units 43, 46.

Each of the first and second intermediate end offices 50 and 60 is comprised of the first transfer switch (41, 47) for transferring the line switching control signal for the long distance side to the opposite intermediate end office or transferring inside the line switching control signal for the short distance line side; the signal discriminating unit (42, 48) for discriminating the received line switching control signal; the line switching processing unit (40, 49), connected to the signal discriminating unit, for controlling the connection of the protection lines and also its own side receiving-end/transmitting-end switches; and the transmission data processing unit (43, 46), connected to the line switching processing unit, for generating the line switching control signal.

In the arrangement of FIG. 7 there is a problem, in replacing a faulty long distance line between the offices 10 and 20, of how the protection line of the DI office 30 can be connected to the long distance line side and how the information for the switching can be transmitted to the receiving-end office.

For solving the above problem, the line switching control signal $S_{sc}$ is set up to have the data format shown in FIG. 8. The signal $S_{sc}$ is composed of data for the short distance line, data for the long distance line, and data for discriminating the line.

The data for discriminating the line is a flag, discriminating between the long distance line and the short distance line as shown by a L/S bit "a". The data for the short distance line contains TSW.CONT bit "b" for controlling the transmission-end switch, R.SW bit "c" for controlling the receiving-end switch, OCC.T bit "d" for a protection side occasion of a transmission, OCC.R bit "e" for a protection side occasion of a reception, and TEST.DRV and TEST.ANS bits "f" and "g" for achieving a line test. DRV and ANS are abbreviations for drive and answer.

The data for the long distance line contains DI1.ANS, DI2.ANS, DI3.ANS, bits "h" for the response signal from the protection side switch in the DI office 30, TSW.CONT bits "i" for controlling the transmitting-end switches, R.SW bit "j" for controlling the receiving-end switch, OCC.T bit "k" for a protection side occasion of a transmission, OCC.R bit "l" for a protection side occasion of a reception, TEST.DRV bit "m", TEST.ANS bit "n" for achieving a line test and PARITY bit "o" for a parity check.

The procedure for replacing a faulty long distance line will be explained below.

Step 1.

A fault occurs in the main long distance line between the offices 10 and 20. The fault is detected by the office 10.

Step 2.

After detection of the fault in the main long distance line by the office 10, the first switching processing unit 13 confirms the conditions of the protection line (10→30) preceding the office 30 regarding the occupation status and the alarm status.

According to the confirmation, if the preceding protection line is not occupied and is normal, the upstream line switching control signal $U.S_{sc}$ is generated at the transmission data processing unit 14 and sends the same in the direction along 11→30→20, in this order. In this case the L/S bit "a" is set to "1" indicating the long distance line side.

Step 3.

The DI office 30 always watches for the arrival of the signal $U.S_{sc}$ and discriminates the received $U.S_{sc}$ at the first signal discriminating unit 48.

For the discrimination, the head flag "a" is first watched and it is detected that the L/S flag bit "a" (logic "1") now specifies the long distance line side. The line switch processing unit 40 then confirms the conditions of the preceding protection line (30→20) to determine whether or not it is occupied and is normal.

If it is confirmed that the protection line (30→20) is not occupied and is normal, the upstream signal $U.S_{sc}$ is further transmitted by the second transmission data processing unit 43. At the same time, the protection side switch in the DI office 30 is closed (turned on). Soon after this, the response signal from the protection side switch is transferred from the DI office 30 to the first terminal office 30 in the form of a downstream line switching control signal $D.S_{sc}$). Here, it is important to note that the essential feature of the present invention resides in the transmission of the signal $D.S_{sc}$ including the response signal from the protection side switch to the first office 10 simultaneously with the transmission of the signal $U.S_{sc}$ to the second office 20.

Step 4.

In the second terminal office 20, the signal $U.S_{sc}$ is received from the DI office 30 and the second switching processing unit 23 in the office 20 then controls the corresponding transmitting-end switch (TSW) to perform the aforesaid parallel transmission thereat, where the pilot signal is stopped and the main line and the protection line are connected in parallel.

When the response signal from the switch (TSW) is issued, the receiving-end switch control command (refer to the bit "j" in FIG. 8) is generated and inserted in the downstream line switching control signal $D.S_{sc}$, which is to be sent from the second office 20 to the first office 10.

Step 5.

When the signal D.S$_{sc}$ from the office 20 is received at the DI office 30, it is discriminated at the second signal discriminating unit 42 therein and the office 30 relays the long distance line side information.

Step 6.

The signal D.S$_{sc}$ from the DI office 30 is received at the first office 10 and discriminated by the first signal discriminating unit 12.

According to the discrimination, when it is detected that the received signal D.S$_{sc}$ specifies the R SW bit "j" (logic "1"), i.e., the receiving-end switch drive command, it is confirmed whether or not the response signal from the protection side switch of the DI office 30 has reached the office 10.

After the confirmation, it is determined in the office 10 that the protection line has switched to the long distance line side so that the faulty main long distance line is replaced by the protection line. Here the line switching sequence ends.

As explained above, according to the first embodiment of the present invention, the following three advantages are obtained.

First, in the line switching control of N vs 1 lines via the DI office 30, a faulty long distance line can be replaced at high speed comparable with the speed attained in the conventional system constructed with the first and second terminal offices only.

Second, a digital radio transmission system of N vs 1 lines via the DI office can be realized at relatively low cost.

Third, the system of the present invention can be realized with a rather small scale compared to the conventional system, since both the radio transmitting and receiving-end switches (SW's) and the multiplexer (MUX)/demultiplexer (DMUX) units, which are necessary for the long distance line transmission in the conventional system, are removed in the system of the present invention.

This, the system including the DI office, and the conventional system including the terminal offices, become comparable with each other, so that a system cost, in terms of the small or medium scale line capacity, can be reduced.

Figure 9:
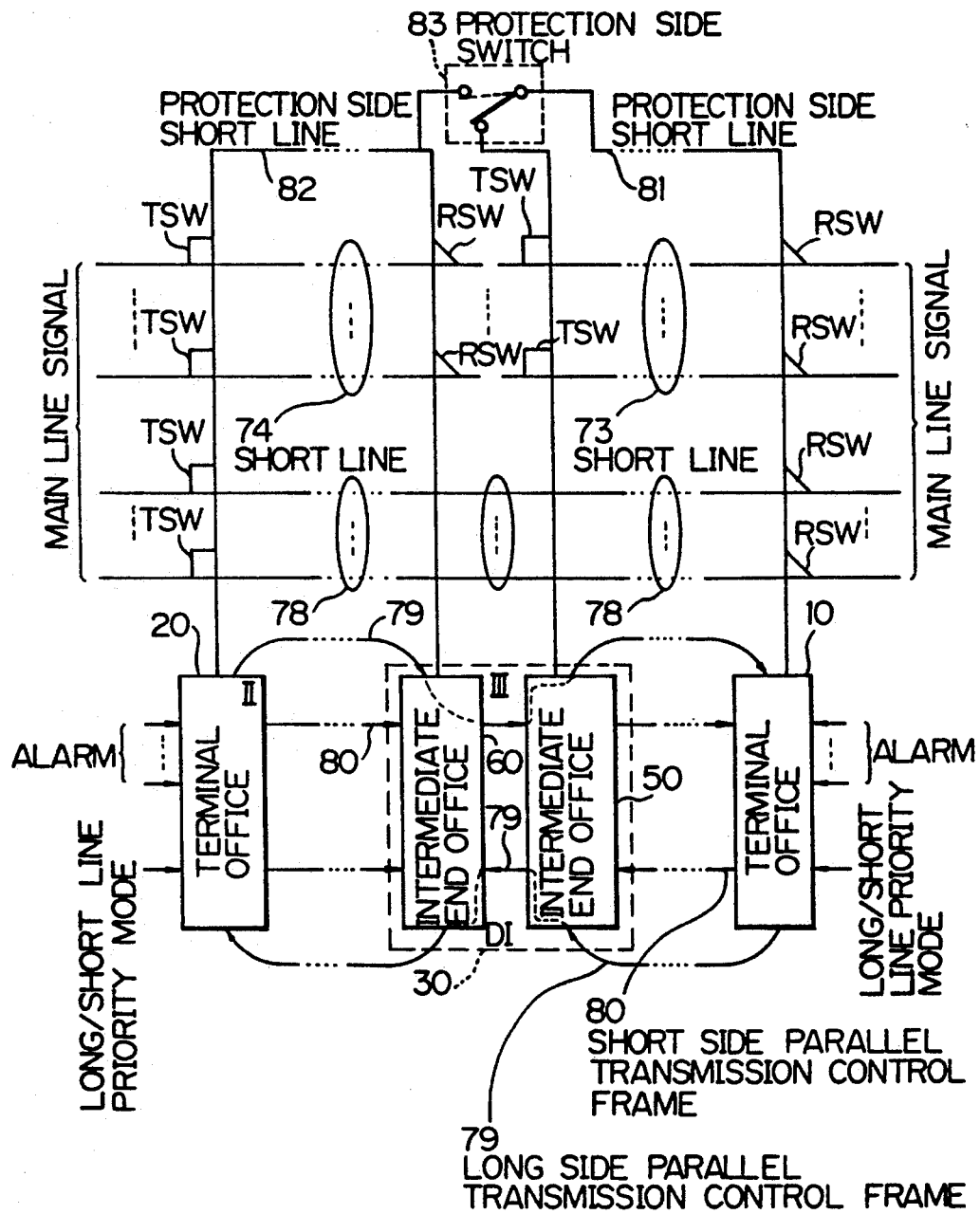
FIG. 9 is a schematic block diagram of a digital radio transmission system according to a second embodiment of the present invention.

FIG. 9 is a schematic block diagram of a digital radio transmission system according to the second embodiment of the present invention.

First, the long distance line 78 is distributed between the first terminal office 10 and the second terminal office 20 by way of the DI office 30, as in the first embodiment. Also the first and second short distance lines 73 and 74 are distributed between the first intermediate end office 50 and the first office 10 and between the second intermediate end office 60 and the second office 20, respectively. Note only one DI office 30 is illustrated for brevity. When a fault occurs among the short distance lines 73, 74 and the long distance line 78, a related alarm signal "ALARM" is generated. The terminal office (10 or 20) which receives the alarm signal, outputs a short distance line side parallel transmission control frame signal 79 or a long distance line side parallel transmission control frame signal according to a short distance line side priority mode or long distance side priority mode either one of which is predetermined. Note the offices 50 and 60 receive signals similar to the above-mentioned signals "ALARM", however the signals for the offices 50 and 60 are not illustrated in the figure for brevity.

The DI office 30 is constructed such that the long distance line side parallel transmission control frame signal 79 can pass between the first and second intermediate end offices 50 and 60. Thus, when the frame signal 79 is received at the office 50 or 60, it is then passed therethrough to reach the opposite terminal office 20 or 10.

In this way, as illustrated in FIG. 9., the frame signal 79 travels along the office 10 to office 50 to to office 60→office 20, in this order. The second terminal office 20 receiving the frame signal 79 drives the transmitting-end switch TSW as usual to perform the parallel transmission of both the short distance line 74 and the protection side short distance line 82. Thereafter, the long distance line side parallel transmission control frame signal is set again to travel along the office 60 to the office 50 to the office 10 in this order. The office 10 receiving this frame signal drives the receiving-end switch RSW as usual to perform a receiving-end switch connection.

At the same time, the intermediate end offices 50 and 60 receiving the frame signal 79 operate the protection side switch 83 to connect the protection side short distance line 81 and 82 to each other.

Thus, even when the long distance line 78 between the offices 10 and 20 is in an alarm state, it is possible to switch from the faulty main line to the protection line via the protection side lines 81, 82 and the protection side switch 83.

On the other hand, when the intermediate end office 50 (or 60) receives the short distance line side parallel transmission control frame signal 80, as in the conventional manner, the protection side short distance line 81 (or 82) is formed between the office 50 (or 60) and the office 10 (or 20), so that the faulty main line can be switched to the protection line.

Figures 10, 10A:
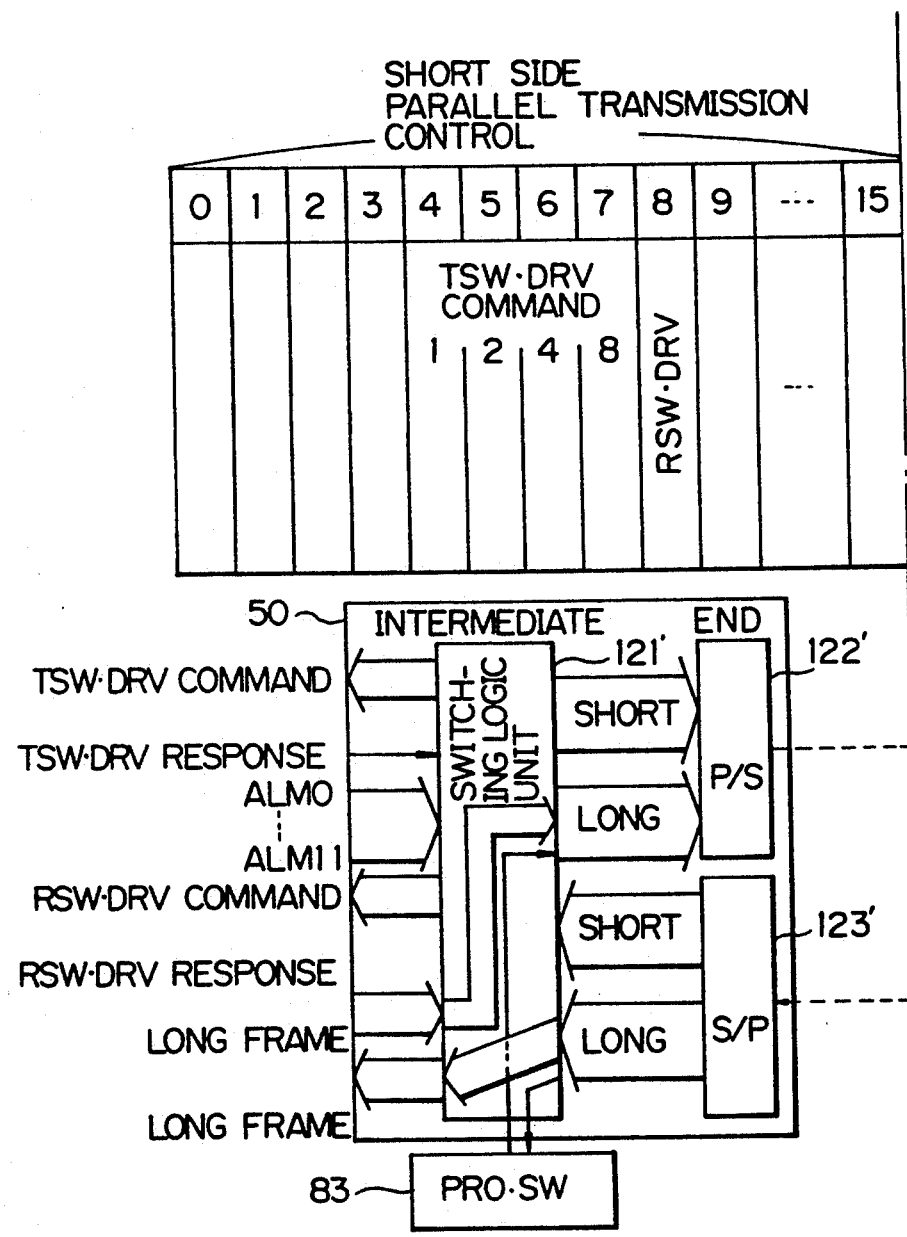
FIG. 10 illustrates the arrangement of FIGS. 10A and 10B.
FIGS. 10A and 10B are views illustrating the first terminal office and the first intermediate end office shown in FIG. 9 together with the control frame signal to be communicated between the terminals.
Figure 10B:
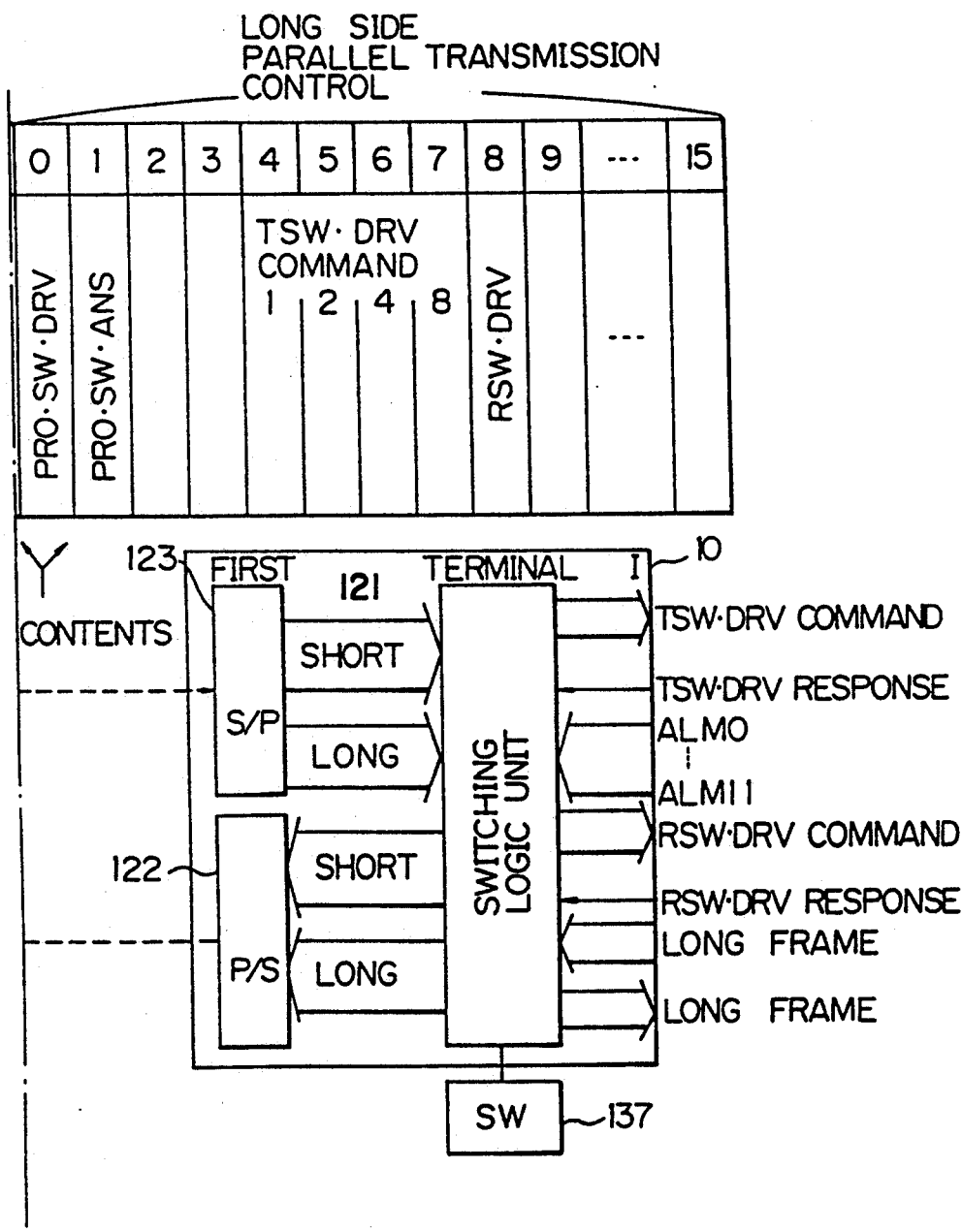

FIG. 10 (10A, 10B) is a view illustrating the first terminal office and the first intermediate end office shown in FIG. 9 together with the control frame signal to be communicated between the first and second terminal offices.

The differences between the view shown in FIG. 3 and the view shown in FIG. 10 are as follows. First, the parallel transmission control frame signal contains the long distance line side control frame signal other than the conventional short distance line side control frame signal. Second, switches 135 and 136 (see FIG. 11) for selecting the short line side control frame signal and the long line side control frame signal are mounted in a switching logic unit 121 of the first office 10. Third, the protection side switch 83 is connected to a switching logic unit 121' of the office 50 for the connection between the protection side short distance lines 81 and 82. It should be noted that the same also applies to the set of both the offices 60 and 20 in FIG. 9.

Figure 11A:
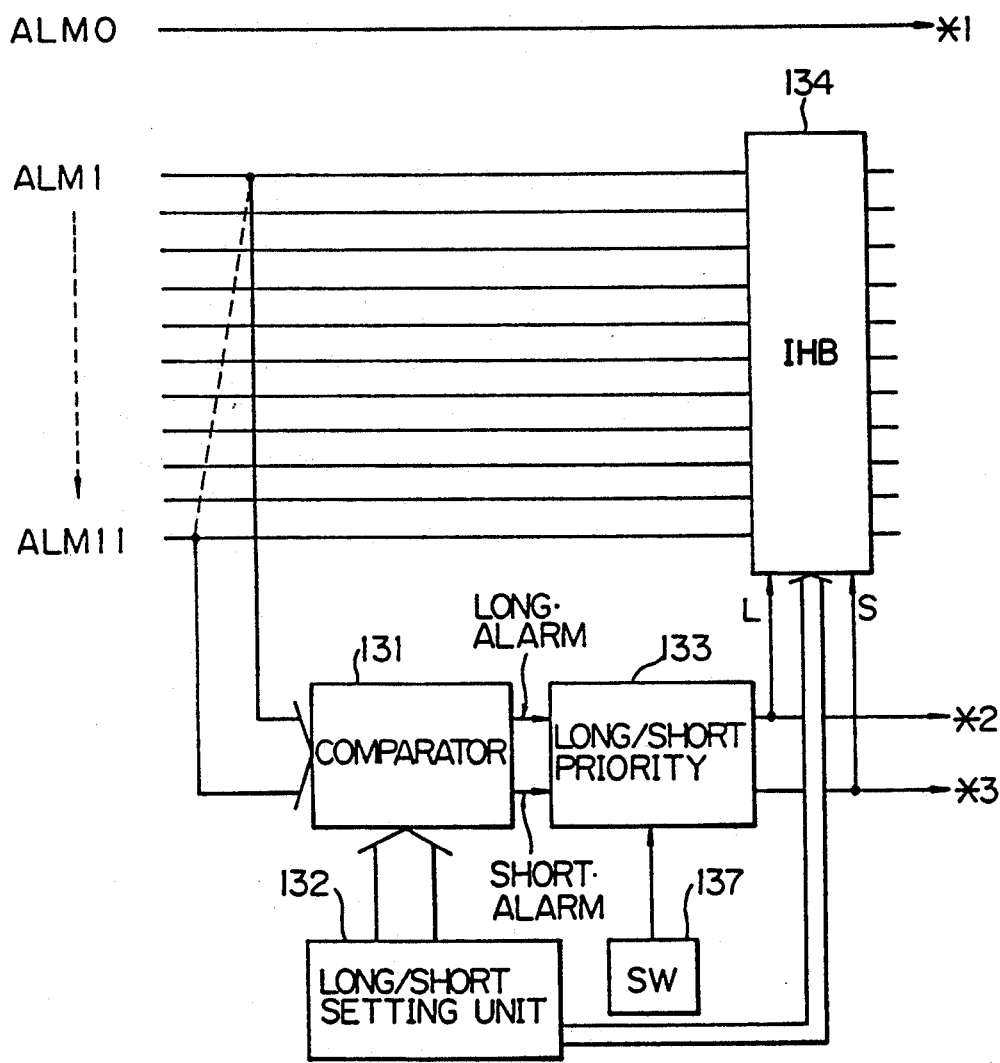

FIGS. 11A and 11B are circuit diagrams showing a specific construction of the switching logic unit. The switching logic unit (121, 121') includes a switching logic part 140 (141 through 146), a comparator 131, a long/short setting unit 132, a long/short priority decision unit 133, an inhibit (IHB) circuit 134 and the aforesaid switches, i.e., gates 135 and 136.

The operation of the switching logic unit 121 (121') will be explained below.

The earliest one of the alarm signals ALM1 through ALM11, corresponding to respective main lines, is applied to both the inhibit circuit 134 and the comparator before inputting these alarm signals to the decoder 141.

First, the comparator 131 compares these alarm signals ALM1 through ALM11 with memory flags in the long/short setting unit 132, which memory flags indicate whether the corresponding main lines are the long distance lines or the short distance lines.

According to the results of the above comparison, the comparator produces a long line side alarm of logic "H" level if the faulty main line or lines belong to the long line side only, but produces a short line side alarm of logic "H" level if the faulty main line or lines belong to the short line side only. If the faulty main lines belong to both the short and long line sides, both the long and short line side alarms are issued from the comparator 131 and sent to the long/short priority decision unit 133.

The priority decision unit 133 is provided with a switch (SW) 137, and the switch status is determined in advance according to a condition of which line, i.e., long line or short line, should be given priority when the long line side alarm and the short line side alarm are issued simultaneously.

Accordingly, if the switch 137 is preset to give priority to the long line side, the faulty long line side main line is replaced first. Thus, a line L assumes logic "H" level, while a line S assumes logic "L" level. These levels are applied to the inhibit circuit 134. Incidentally, if there is no conflict between the long and short line side alarms, the priority decision unit 133 sends the respective alarm, as they are, to the line L or S.

Figure 11C:
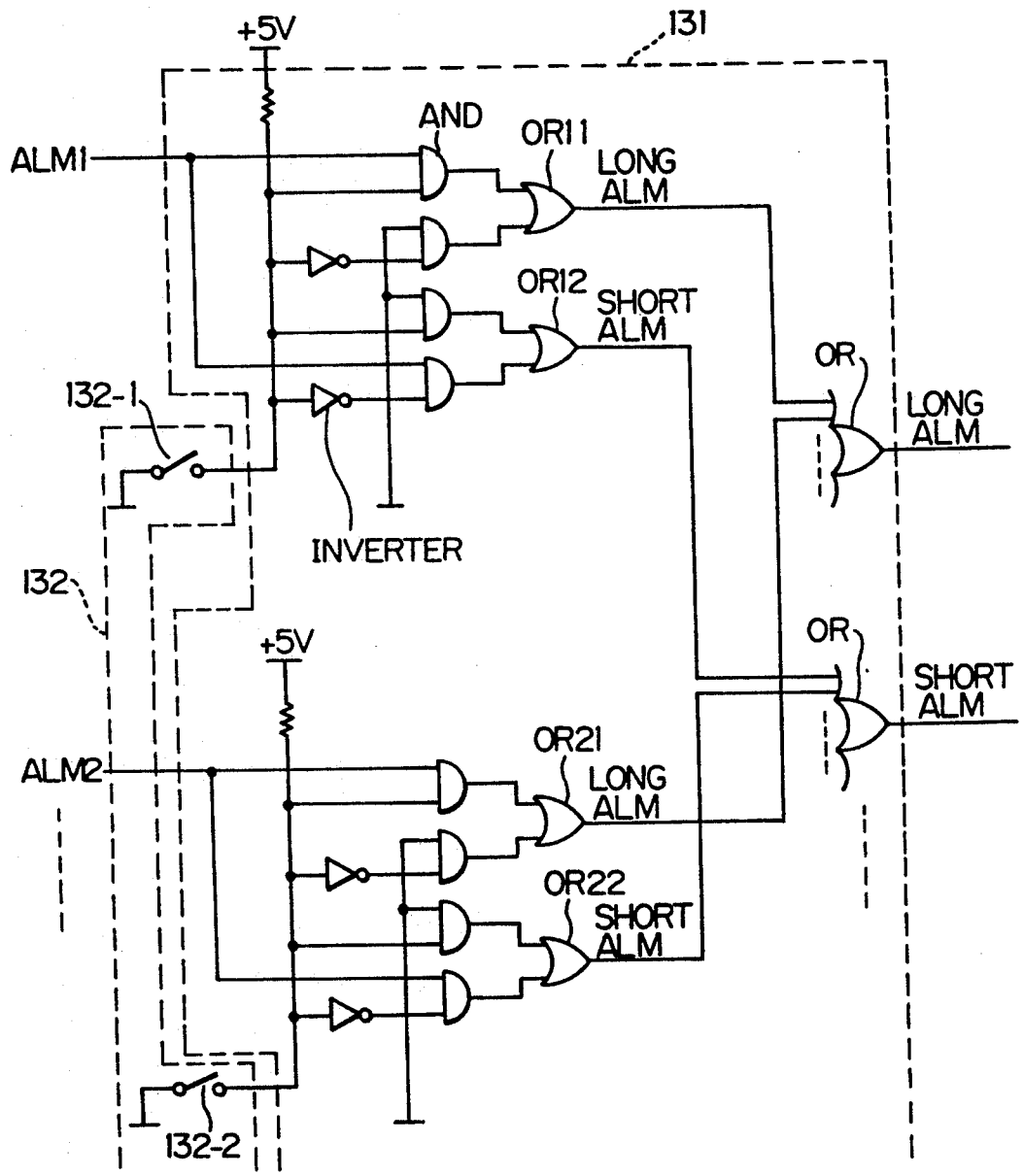
FIG. 11C is a circuit diagram of an example of both the comparator and the long/short setting unit.

FIG. 11C is a circuit diagram of an example of both the comparator and the long/short setting unit. The unit 132 has switches 132-1, 132-2 . . . which are made open or close for indication of the long line side or the short line side. In the comparator 131, using as an example the alarm signal ALM1, if the signal ALM1 belongs to the long line side, the switch 132-1 is opened from the first and maintained. When the signal ALM1 of "H" level is supplied, due to the AND gates, OR gates and inverters of the comparator 131, the long line side alarm is output from the OR gate OR11. If the signal ALM2 belongs to the short line side, the switch 132-2 is closed from the first and maintained. When the signal ALM2 of "H" level is supplied, the OR gate 22 outputs the short line side alarm.

Figure 11D:
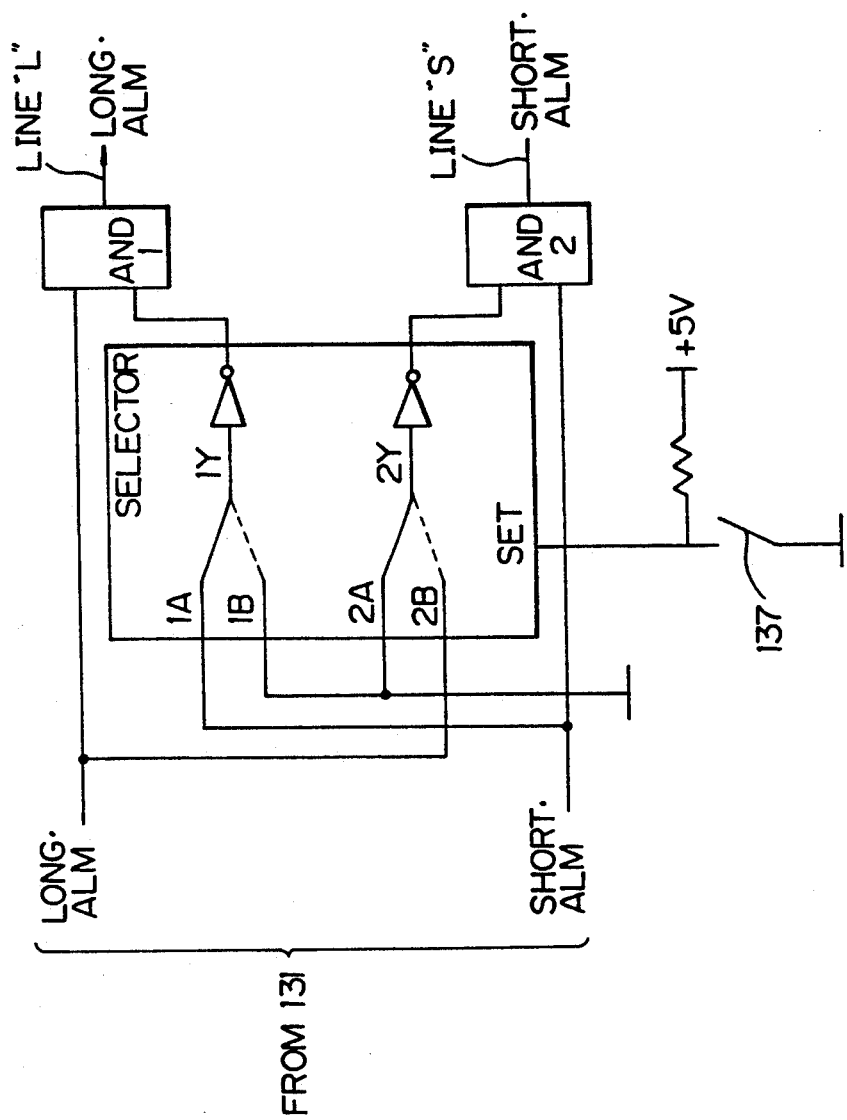
FIG. 11D is a circuit diagram of an example of the long/short priority decision unit.

FIG. 11D is a circuit diagram of an example of the long/short priority decision unit. The circuit 133 cooperates with the switch 137. When the switch 137 is closed, the solid line routes are selected and the AND2 is opened to pass the short side alarm of "H" level therethrough, if it exists. When the switch 137 is opened, the broken line routes are selected and the AND1 is opened to pass the long side alarm of "H" level therethrough, if it exists.

FIG. 12 is a circuit diagram of an example of an inhibit circuit. The inhibit circuit 134 is comprised of AND gates 151, 152, 153 . . . and switches 161, 162, 163 . . . The switches are preset by the long/short setting unit 132 (FIG. 11A). In the example of FIG. 12, the alarm signals ALM1 and ALM2 are allotted to the short line side, and the alarm signal ALM3 is allotted to the long line side.

Assuming that the long line side priority mode is set (line L="H"), only the alarm signals belonging the long line side can be passed through the AND gates 151, 152, 153 . . . of the inhibit circuit 134 to reach the decoder 141, at which the alarm signal is decoded to obtain 4-bit code data and is sent to a latch circuit 142.

Thus, the earliest alarm signal from among ALM1 through ALM11 appears as the 4-bit code data at the latch circuit 142. The comparator 143 compares both the data at the input stage and the output stage of the circuit 142. If these data do not coincide with each other and only in this case, an enable pulse is given to the latch circuit 142, in order to latch the input stage 4-bit code data.

The output from the circuit 142 is applied, via an OR gate 144, to an R-S flip.flop (FF) 145 at its reset input R. (See FIG. 11B) Thus, the FF 145 is still maintained in a reset status so long as the set input S changes to logic "H" which indicates the protection line is being occupied by another main line. The thus reset FF 145 makes a gate 146 open to produce the output of the latch circuit 142 as the aforesaid TSW.DRV command, i.e., transmitting the end switch drive command. This command is inserted at the bits 4 through 7 of the parallel transmission control frame signal of FIG. 10.

Returning to FIG. 11B, the gate 135 outputs the TSW.DRV command, together with the protection side switch drive command, under the long line side priority mode set by the logic "H" level on the line L. On the other hand, the gate 136 outputs the TSW.DRV command, under the short line side priority mode set by the logic "H" level on the line S.

The aforesaid TSW.DRV command and the protection side switch drive command for activating the switch 83 compose the corresponding bits in the long line side parallel transmission control frame signal.

The thus generated control frame signal by, for example, the switching logic unit 121 is supplied to the intermediate end office 50 via the parallel/serial (P/S) converting circuit 122 and the serial/parallel (S/P) converting 23', so that if the control frame signal is for the long line side, only the protection side switch drive (SW.DRV) command (at bit 0) is extracted and sent to the protection side switch 83 to connect both the protection side short lines 81 and 82 to each other.

At this time, the long line side parallel transmission control frame signal is sent to the second intermediate end office 60 in the same DI office 30. In this case, the offices 50 and 60 are constructed such that the long line side parallel transmission control frame signal can always pass therethrough, while in a case of the short line side parallel transmission control frame signal, the transmission indication bit is merely set to "0".

Thus the long line side parallel transmission control frame signal is sent, via the office 60, to the second office 20 where the TSW.DRV command (bit 4 through bit 7) is taken out therefrom to provide the drive (DRV) command to the transmitting-end switch TSW (FIG. 9) corresponding to the faulty main long line.

The switch TSW receiving the above command returns the signal responding to the TSW.DRV, i.e., TSW.DRV response signal and then the switching logic unit 121 in the second terminal office 20 generates the parallel transmission control frame signal shown in FIG. 10 in which frame signal the receiving-end switch drive (RSW.DRV) command for the first office 10 is inserted, and then transmitted to the intermediate end office 60 through its P/S converting circuit 122.

The switching logic unit 121 in the intermediate end office 60 receiving the long line side parallel transmission control frame signal via its S/P converting circuit 123 transmits the same, as it is, to the intermediate end office 50.

In this way, the office 50 passes the above control frame signal through its switching logic unit 121' to output the same from the P/S converting circuit 122' to the first office 10.

At this time, the protection side switch answer (ANS) from the protection side switch 83 as a response to the protection side switch drive (SW.DRV) command, is generated and inserted at bit 1 in the frame signal of FIG. 10.

In the first terminal office 10, the switching logic unit 121 decodes the long distance line side parallel transmission control frame signal from the S/P converting circuit 123. If the bit, in the frame signal, of the protection side switch answer (ANS) is effective, then the corresponding receiving-end switch RSW is driven.

Figure 13:
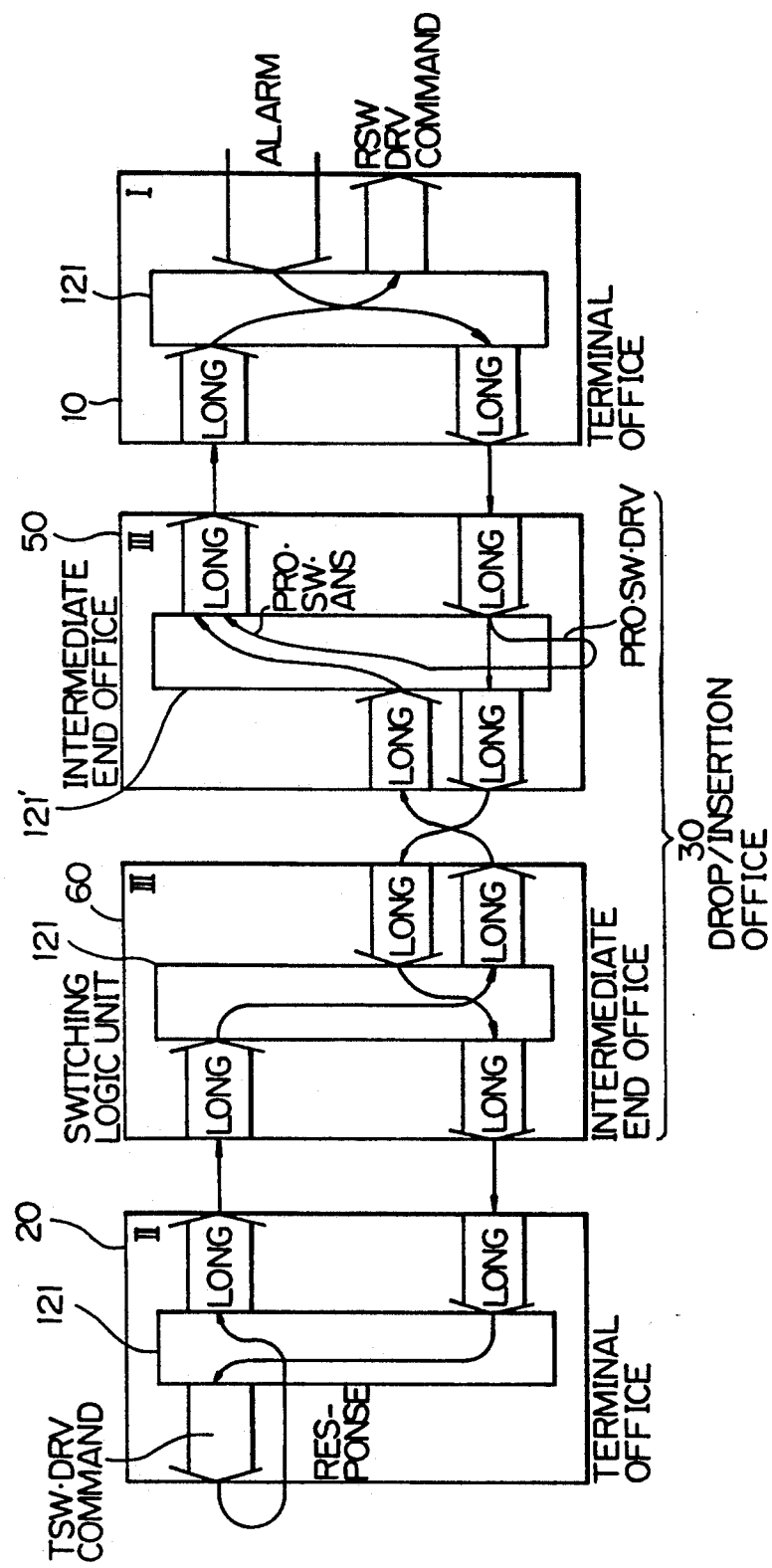
FIG. 13 depicts a signal flow of the long distance line side parallel transmission control frame signal according to the present invention.

FIG. 13 depicts a signal flow of the long distance line side parallel transmission control frame signal according to the present invention. As understood from FIG. 13, the control frame signal travels of the office 10 to the office 50 to the office 60 to the office 20 to the office 6 to the office 50 to the office 10, so that the faulty main long line is switched to the protection line.

Figure 14:
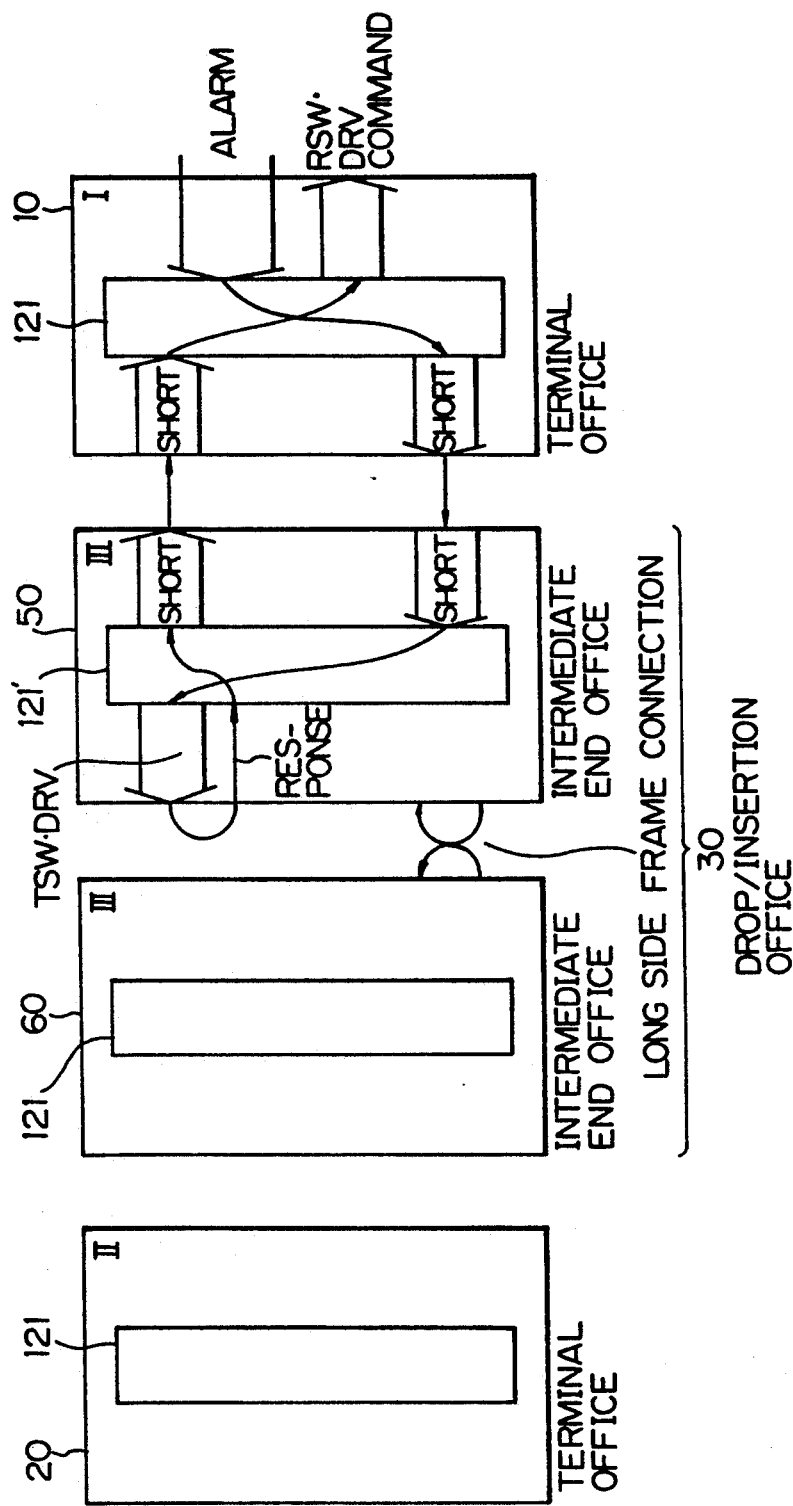
FIG. 14 depicts a signal flow of the short distance line side paralleled transmission control frame signal according to the present invention.

FIG. 14 depicts a signal flow of the short distance line side parallel transmission control frame signal according to the present invention. The signal flow of FIG. 14 takes place under the aforesaid short distance line side priority mode. The control sequence is, however, basically the same as that of the prior art (FIG. 4). The differences are that, in the present invention, the control sequence is handled by the short line side parallel transmission control frame signal and the offices 50 and 60 are wired, as previously mentioned, to transfer therebetween the long side parallel transmission control frame signal.

The above explanation is made taking as an example a case where a single DI office 30 exists between the offices 10 and 20. However it is of course possible to accommodate two or more DI offices by using multiple pairs of protection side switch drive (SW.DRV) command bits and the corresponding protection side switch answer (ANS) bits for each DI office.

As mentioned above, each terminal office outputs the long distance side or short distance side parallel transmission control frame signal according to the long line side priority mode or the short line side priority mode either of which is predetermined. When the long side control frame signal is received by the DI office, it passes the received signal to the opposite office and, at the same time, the DI office operates the protection side switch to close the same so the first and second protection side short lines are connected to each other. Thus the faulty main long line is switched to the protection long line. This means is not required to introduce a protection line for the long line side separately in the transmission system. This also enables reduction of the number of the aforesaid TSW's and RSW's which would be required at both terminal offices.

Finally, the third embodiment according to the present invention will be explained. The third embodiment is based on the first embodiment and further adds the long/short priority selecting function, as in the second embodiment, to the first embodiment.

Figure 15:
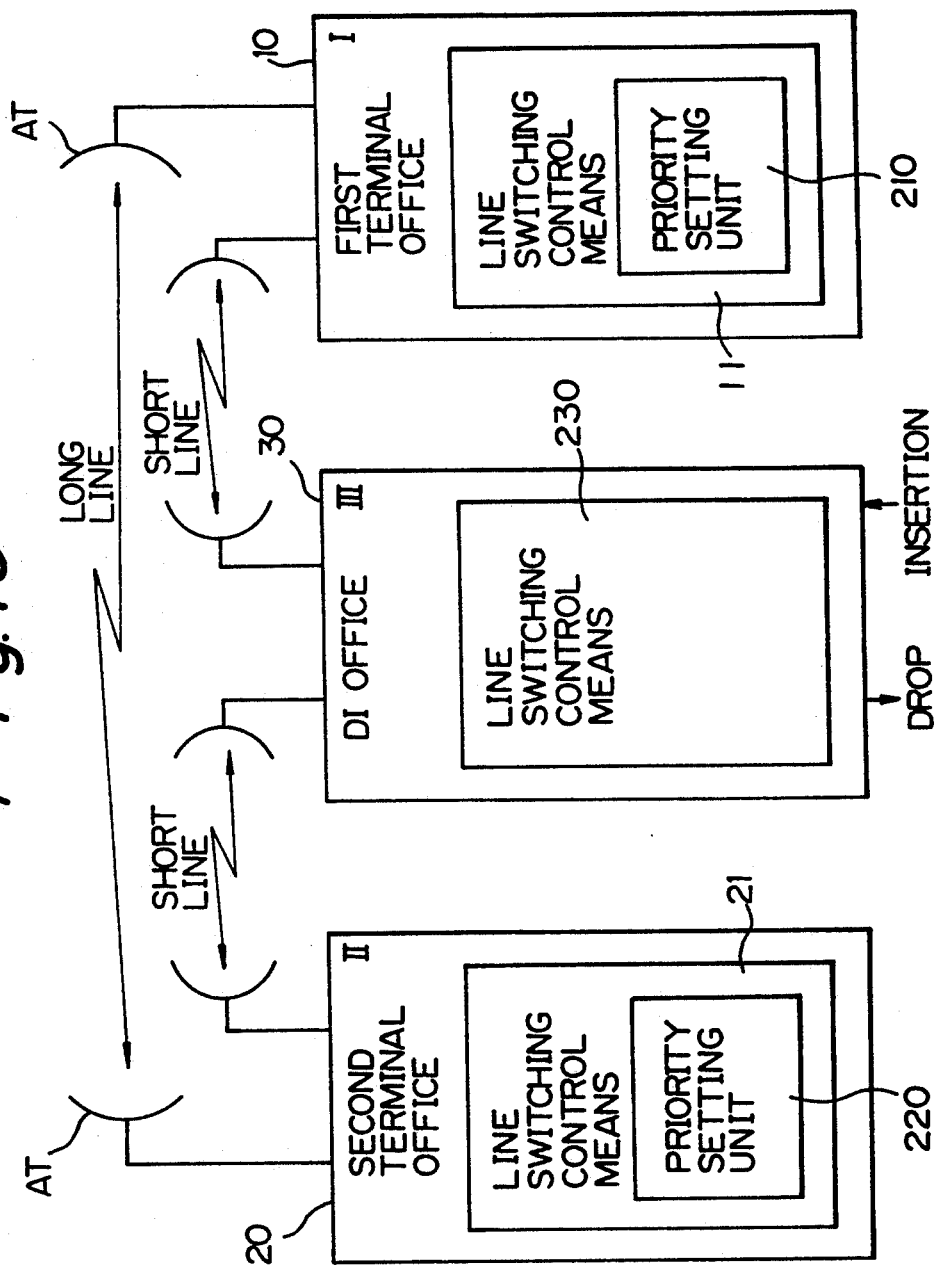
FIG. 15 is a block diagram showing a principle of a digital radio communication system according to the third embodiment of the present invention.

FIG. 15 is a block diagram showing a principle of a digital radio communication system according to the third embodiment of the present invention. As seen from FIG. 15, the first and second line switching control means 11 and 21 include therein long/short (L/S) priority setting units 210 and 220. The DI office 30 has a line switching control means 230 which represents, as a whole, the various units 40 through 49 shown in FIG. 7 (first embodiment). Note that the basic operation achieved in the third embodiment is basically the same as that of the first embodiment.

In a case where a double fault of the long line side and the short line side occur in the main lines, such a double fault can be replaced by the priority setting units 210 and 220. The priority can be preset by, for example, a manual operation in advance.

Assume that some fault occurs in the long side main line and the fault is being replaced in the manner as mentioned before. However, during the replacing procedure, another fault occurs in the short side main line, between the second office 20 and the DI office 30.

In that case, the related fault information of the short line side is transmitted from the line switching control means 230 in the DI office 30 to the first terminal office 10.

Thus the first office 10 receives the fault information of the short line side other than the inherent fault information of the long line side, and accordingly, the first line switching control means 11 starts discriminating the long/short (L/S) priority by the use of the L/S priority setting unit 210, to determine to which line (short line or long line) the priority should be given for replacing.

If, in this case, the priority is given to the long distance line, the faulty main long line is still replaced by the protection line, however, if the priority is given to the short distance line, the replacing of the long line is released to switch the replacing to the short line.

Thus, even if a double fault occurs in both the long and short main lines, either one of the lines can be replaced at high speed.

Figure 16:
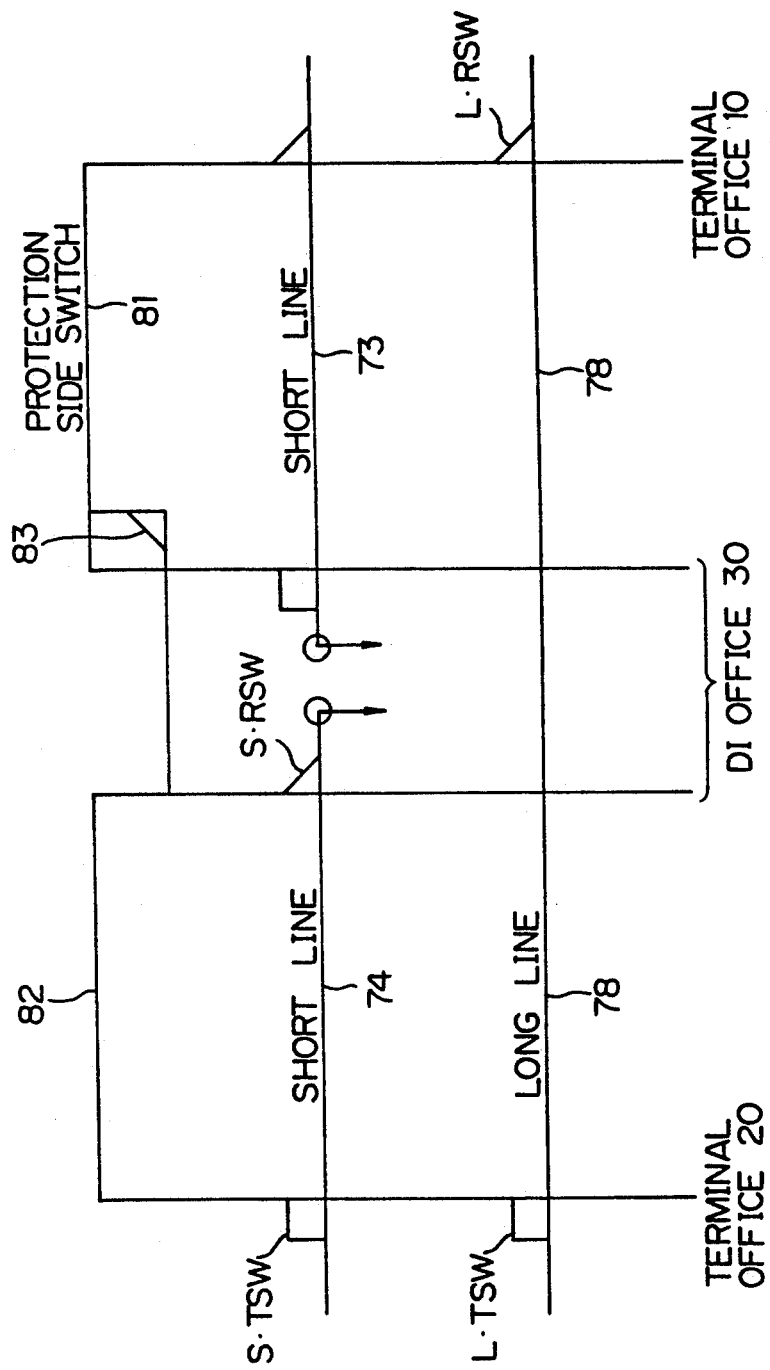
FIG. 16 illustrates a specific wiring arrangement of the lines shown in FIG. 15.

FIG. 16 illustrates a specific wiring arrangement of the lines shown in FIG. 15. It should be noted that the arrangement of FIG. 16 is substantially the same as that of FIG. 9. The line members 73, 74, 78, 81, and 82 have already been explained, the protection side switch 83, the long (L) side and short (S) side transmitting-end switches L.TSW and S.TSW, the long side and short side receiving-end switches L.RSW and S.RSW, the offices 10, 20, 30 have also already been explained.

FIG. 17 is a block diagram of an example of the L/S priority setting unit. The units 210 and 220 (FIG. 15) have the same construction, and therefore the unit 210 is used in FIG. 17 as a representative example. The L/S priority setting unit 210 is comprised of a selector 211, an alarm discriminating unit 212 for a discrimination between the long side and the short side, a priority decision unit 213 and a priority setting switch 214.

When some main line alarm signal is applied to the input side in terms of channel numbers ($CH_0 \ldots CH_n$), the unit 212 discriminates the alarm to distinguish from which line (short line or long line) the alarm is issued. The thus discriminated output from the unit 212 is given a priority according to a priority order determined by the unit 213. Thus, the priority is given to either the long side alarm or the short side alarm.

Thus the unit 213 controls the selector 211 to pass the alarm with the highest priority therethrough, so that the channel number of the faulty line to be replaced is determined.

Figure 18A:
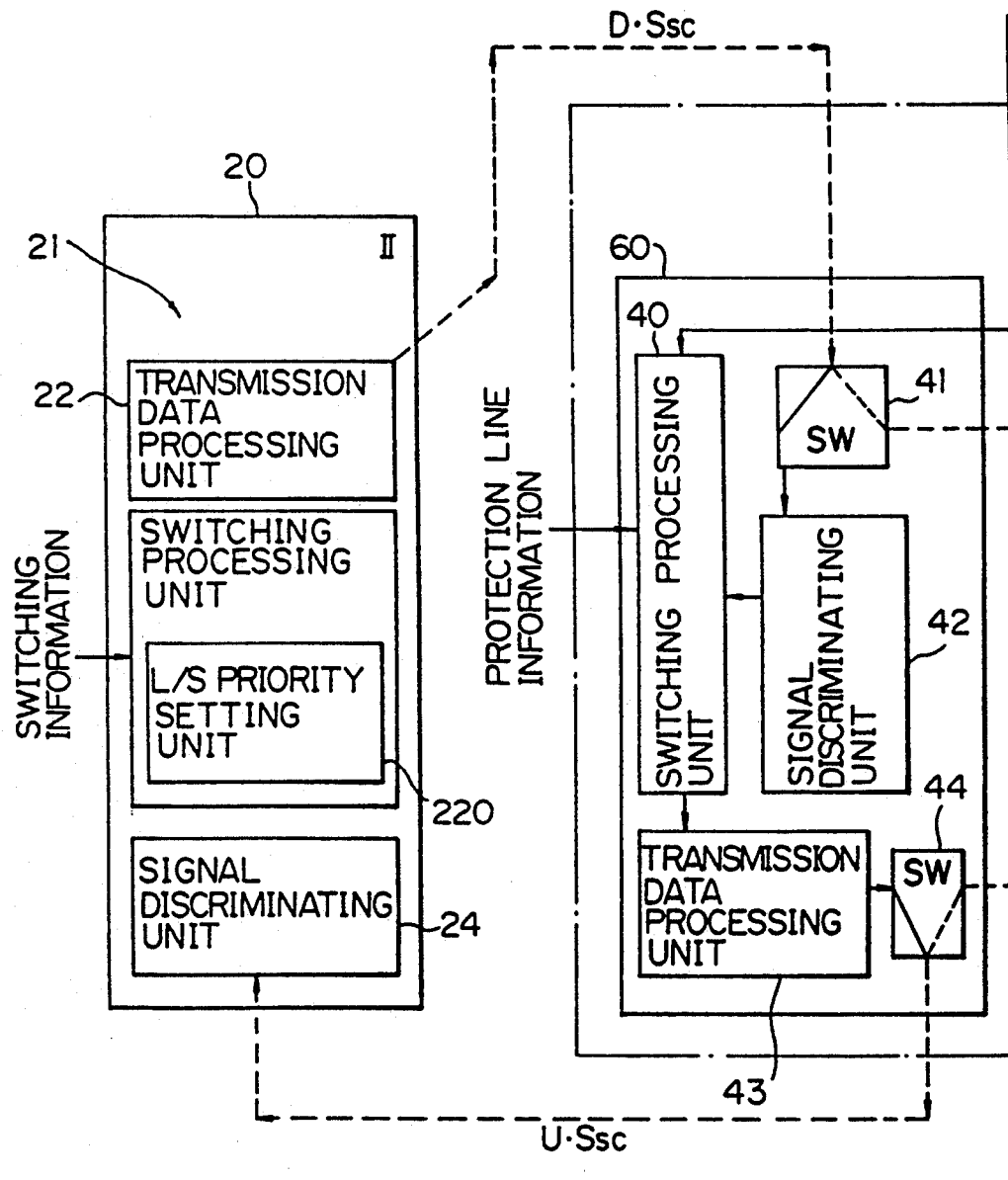
FIGS. 18A and 18B are block diagrams showing a specific construction according to a third embodiment of the present invention.
Figure 18B:
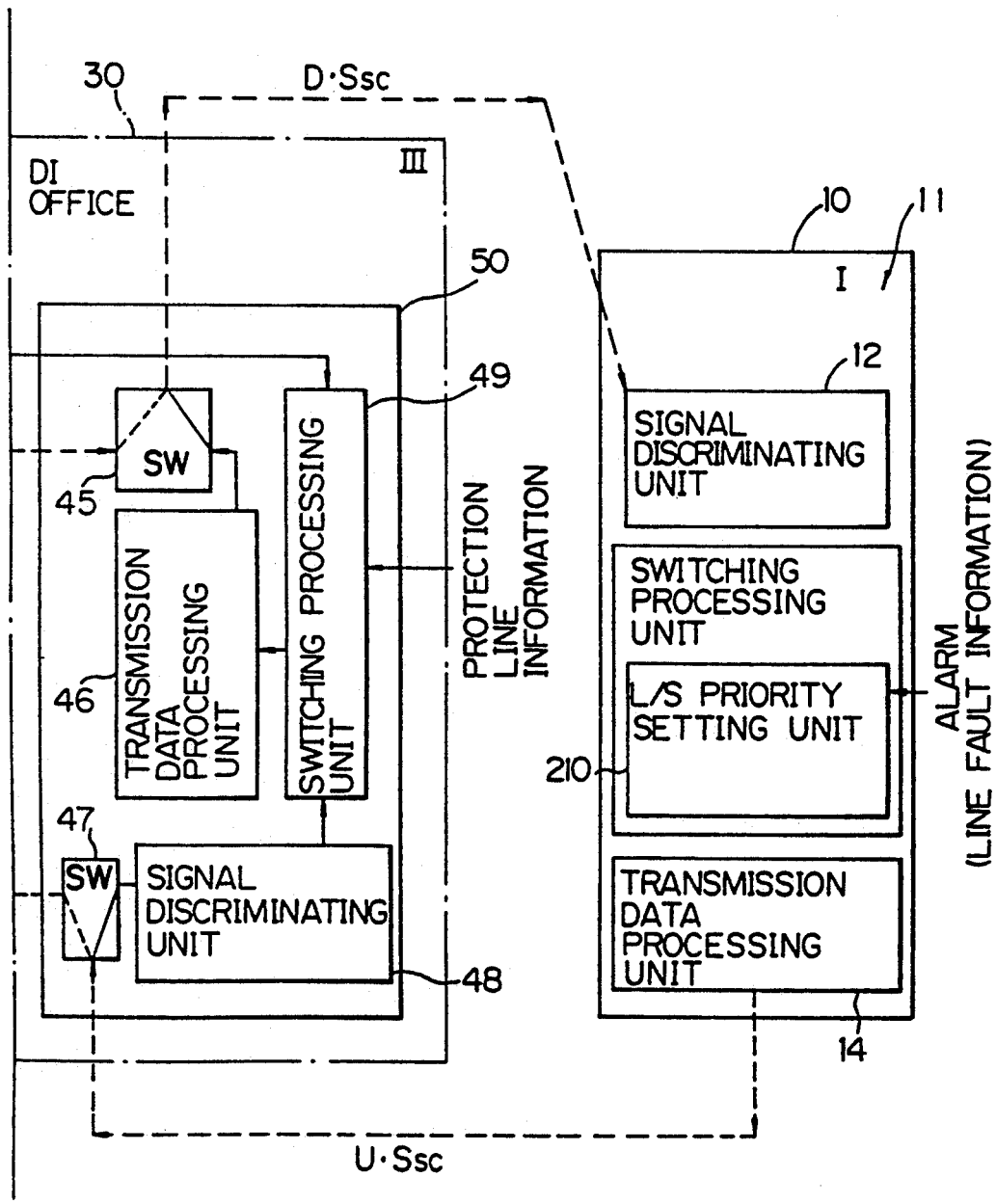

FIG. 18 (18A, 18B) is a block diagram showing a specific construction according to a third embodiment of the present invention. The construction is equivalent to that of FIG. 7 (first embodiment) to which the L/S priority setting units 210 and 220 are further incorporated. The operation of the block diagram shown in FIG. 18 is identical to the aforesaid Step 1 through Step 6 with reference to FIG. 7. Further the parallel transmission control frame signal shown in FIG. 8 is also applicable to the system of FIG. 18.

Figure 19A:
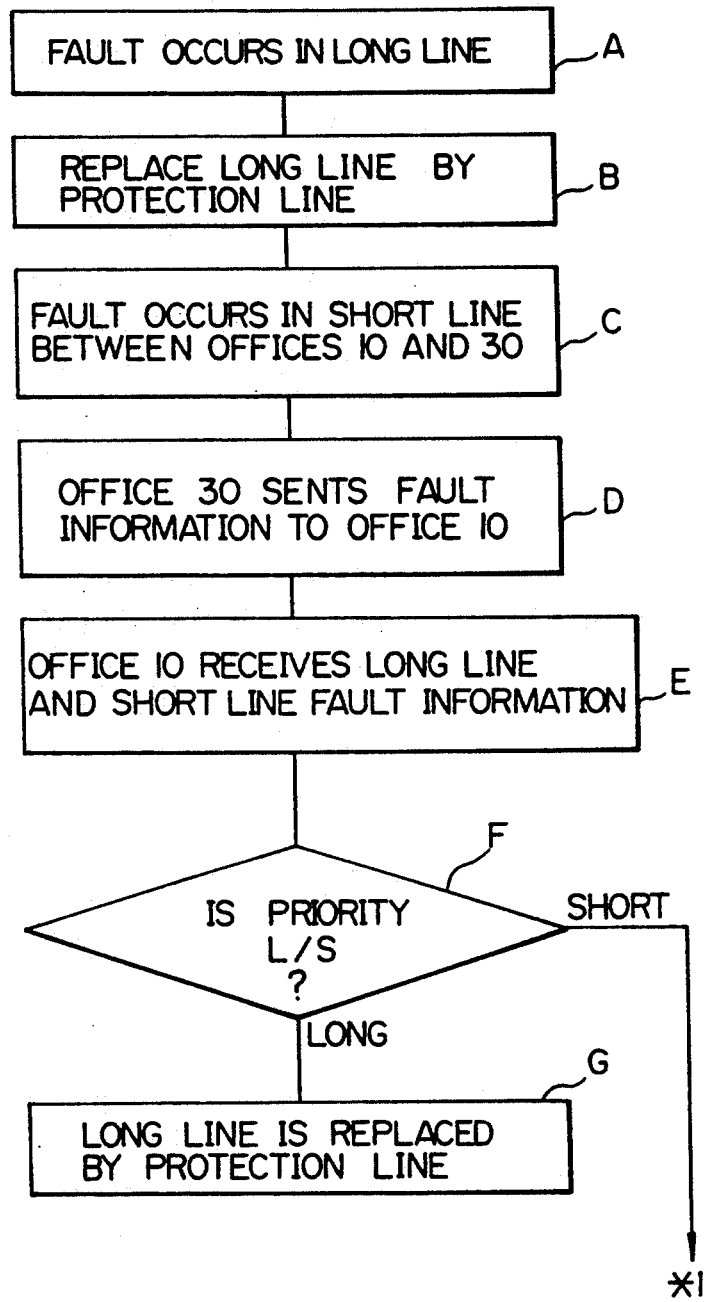

FIGS. 19A and 19B are flow charts for processing double faults occurring in the long side and short side lines. If a fault occurs in the main long distance line (step A), the operation starts for replacing the faulty long line by the protection line (step B). Soon after this, if another fault occurs in the main short distance line between, for example, the office 20 and the DI office 30 (step C), this fault is detected by the DI office 30 and the fault information is sent from the DI office 30 to the first office 10 (step D). In the office 10, the fault information of the short line side is received separately from the fault information of the long line side (step E). In the office 10, after reception of the fault information at the switching processing unit 13, the information is applied to the L/S priority setting unit 210 to determine the channel number to be replaced (step F).

If the long line side priority mode is preset, the faulty long line is replaced by the protection line, and after restoration of the fault in the long line side, if the fault in the short line side still continues, the faulty short line is then replaced by the protection line.

If the short line side priority mode is preset, to the contrary, in the first office 10, the receiving-end switch L.RSW (FIG. 16) is changed to be open, which switch has been replaced the faulty long line by now (step H).

Next, the first office 10 issues to both the second office 20 and the DI office 30 a command to replace the faulty short line (step I). This command is generated by generating the downstream line switching control signal (D.S$_{sc}$) at the transmission data processing unit 14 and sending the same to both the office 20 and DI office 30.

When the DI office 30 receives the signal D.S$_{sc}$, its signal discriminating unit 48 discriminates the same and, by the command from the line switching processing unit 49, the protection side switch 83 is changed to be open (step J).

In the second office 20, when the signal D.S$_{sc}$ is received, its signal discriminating unit 24 discriminates the same, and thereby, the transmitting-end switch L.TSW (FIG. 16) is changed to be open (step K), by the control of the switching processing unit 23.

Then, in the second office 20, the transmitting-end switch S.TSW (FIG. 16) is connected to the protection line side (step L).

When the switch S.TSW is closed, the upstream line switching control signal U.S$_{sc}$ is generated in the transmission data processing unit 22, and is sent to the DI office 30 which is thus informed of the closing of the switch S.TSW (step M).

The DI office 30 receives the signal U.S$_{sc}$ and discriminates the same at its signal discriminating unit 42, so that the receiving-end switch S.RSW (FIG. 16) is closed by the control of the switching processing unit 40 (step N).

In this way, the faulty main short line between the second office 20 and the DI office 30 can be replaced by the protection line 82.

If the faulty long line still continues after the restoration of the faulty short line, then the faulty long line will be replaced by the protection lines 82 and 81 next.

As mentioned above, a line switching to the protection line, subjected to the L/S priority, can be performed with almost the same switching time as the time required in a conventional system comprising only by two terminal offices 10 and 20.

Figure 20:
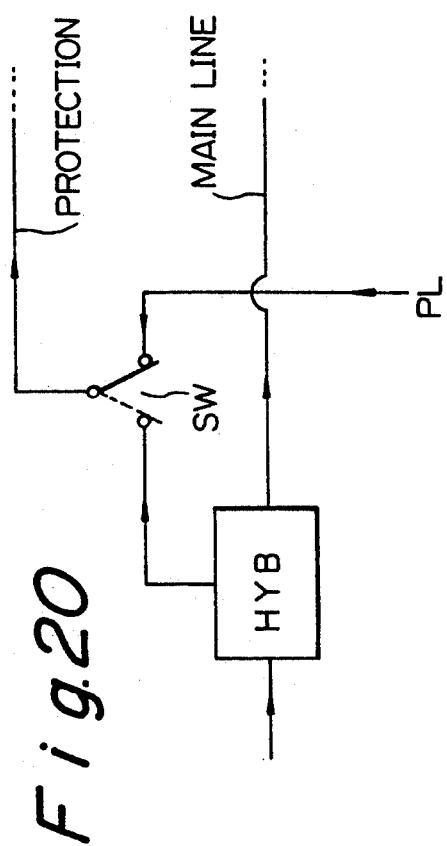
FIG. 20 is a circuit diagram of an example of the transmitting-end switch (TSW)

FIG. 20 is circuit diagram of an example of the transmitting-end switch (TSW).

The switch TSW is comprised of a hybrid circuit HYB and a transfer switch SW. The switch SW usually assumes a switch position as illustrated by solid line to pass the pilot signal PL to the protection line. In an emergency, the switch SW assumes a switch position as illustrated by broken line to create the parallel transmission to both the main line and the protection line.

Figure 21B:
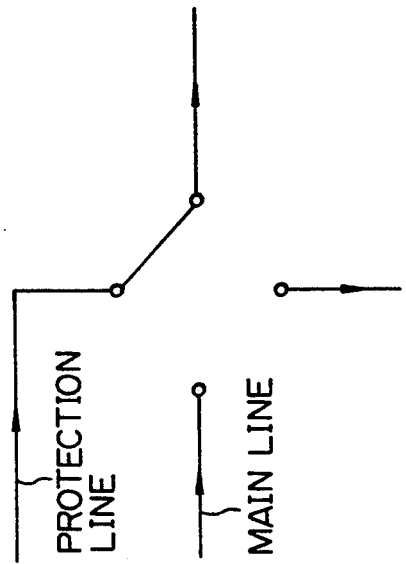
FIGS. 21A and 21B are a schematic circuit diagrams of the receiving-end switch (RSW).
Figure 21A:
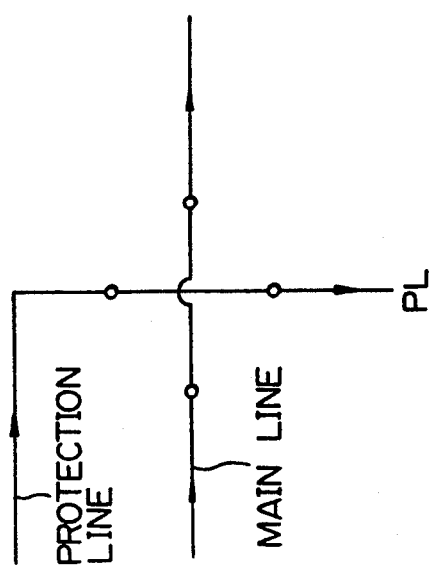

FIGS. 21A and 21B are a schematic circuit diagrams of the receiving-end switch (RSW).

Usually the switch RSW assumes a switch position as shown in FIG. 21A. In an emergency, the switch RSW assumes the position shown in FIG. 21B.

As mentioned above in detail, the present invention provides a digital radio switching system including a drop/insertion office 30 between the two end offices 10 and 20, wherein a protection line for the long distance line can be realized at low cost by commonly utilizing the existing protection lines inherently for the short distance lines. Even so, the switching time for the long distance line side can be maintained at the level needed in a conventional transmission system having no such intermediate DI office or offices.

What is claimed is:
1. A digital radio transmission system, comprising:
   a first terminal office located at an end of the system;
   a second terminal office located at another end of the system;
   at least one drop/insertion office, coupled between said first and said second terminal offices, for dropping and inserting a local transmission signal, including:
      a first intermediate end office,
      a second intermediate end office, and
      drop/insertion processing means for processing the local transmission signal;
   a first protection line and a first short distance line coupled between said first terminal office and said first intermediate end office;
   a second protection line and a second short distance line coupled between said second intermediate end office and said second terminal office;
   a long distance line coupled between said first and second terminal offices, and coupled through said at least one drop/insertion office so as to bypass said drop/insertion processing means; and
   first and second line switching control means provided in said first and second terminal office, respectively, each including:
      means for detecting a fault occurring in said long distance line, and
      means for generating and transmitting an upstream line switching control signal to third line switching control means in said drop/insertion office based on an occupation status and an alarm status of one of said corresponding first and second protection lines, said at least one drop/insertion office further including:
   said third line switching control means for replacing said first short distance line by switching to said first protection line, for replacing said second short distance line by switching to said second protection line, and for replacing said long distance line by switching to said first and second protection lines, said third line switching control means including:
means for transferring the upstream line switching control signal to one of said first and second line switching control means in response to one of said first and second protection lines being in a not occupied state and a normal state, so that one of said first and second terminal offices operatively connects to said one of said first and second protection lines.

2. A system as set forth in claim 1, wherein each drop/insertion office comprises:
transmitter/receiver means for transmitting and receiving the local transmission signal;
modulator/demodulator means for modulating and demodulating the local transmission signal;
receiving-end/transmitting-end means for receiving the demodulated local transmission signal modulator/demodulator means and for transmitting the multiplexed local transmission signal to said modulator/demodulator means; and
multiplexer/demultiplexer means for multiplexing and demultiplexing the local transmission signal.

3. A system as set forth in claim 2, wherein said long distance line is connected to said drop/insertion office by way of said transmitter/receiver means and said modulator/demodulator means.

4. A system as set forth in claim 3, wherein said first and second terminal offices comprise:
first line switching control means and second line switching control means, respectively, for providing a long distance protection line by replacing said long distance line by using said first and second protection lines and by cooperating with said third line switching control means in said drop/insertion office.

5. A system as set forth in claim 4, wherein said third line switching control means includes means for transmitting, in response to receiving the upstream line switching control signal, a response signal to the other one of said first and second terminal offices issuing the upstream line switching control signal.

6. A system as set forth in claim 5, wherein said one of said second and first terminal offices includes means for generating a downstream line switching control signal in response to receiving the upstream line switching control signal, and for transmitting the downstream line switching control signal to said other one of said first and second terminal offices after forming a parallel transmission at said receiving-end/transmitting-end means in said one of said second and first terminal offices.

7. A system as set forth in claim 6, wherein said other one of said first and second line switching control means includes means for driving said receiving-end/transmitting-end means to switch from said long distance line to the one of said first and second protection lines in response to receiving the downstream line switching control signal.

8. A system as set forth in claim 4, wherein each of said first and second line switching control means further comprises:
priority setting means for storing priority, for controlling the one of the first and second line switching control means based on the priority when a fault occurs in said long distance line and, at the same time, another fault occurs in one of said first and second short distance lines and for replacing one of said first and second short and said long distance lines by at least one of said first and second protection lines.

9. A system as set forth in claim 8, wherein said priority setting means comprises:
alarm discriminating means for discriminating whether the fault occurs in said long distance line or said one of said first and second short distance lines;
priority decision means for selecting at least one of said first protection line, said second protection line;
priority setting means for specifying the priority and for applying the priority to the priority decision means; and
selector means for selecting one of the alarm signals to indicate the fault in accordance with the determination specified by said priority decision means.

10. A system as set forth in claim 6, wherein each of said first and second terminal offices further comprises:
signal discriminating means for receiving the upstream line switching control signal;
switching processing means, connected to said line switching control means, for controlling said receiving-end/transmitting-end means in said first and second terminal offices; and
transmission data processing means, connected to said third line switching control means, for transmitting the downstream line switching control signal via said drop/insertion office.

11. A system as set forth in claim 6, wherein each of said first and second intermediate end offices comprises:
signal discriminating means for discriminating the upstream line switching control signal;
first transfer means for transferring the upstream line switching control signal to the other one of said first and second intermediate end offices and for transferring the upstream line switching control signal to said signal discriminating means
line switching processing means, connected to said signal discriminating means and to said signal discriminating means, for controlling the connection of said first and second protection lines and said receiving-end/transmitting-end means; and
transmission data processing means, connected to said line switching processing means and to said line switching processing means, for generating the upstream line switching control signal.

12. A system as set forth in claim 3, wherein each of said drop/insertion offices further comprises:
protection switch means for connecting and disconnecting said first and second protection lines.

13. A system as set forth in claim 12, wherein said protection switch means includes means for replacing one of said first and second short distance lines when open, and for replacing said long distance line when closed.

14. A system as set forth in claim 13, wherein each of said intermediate terminal offices further comprises:
switching logic means for receiving a short distance line side parallel transmission control frame signal and a long distance line side parallel transmission control frame signal, for transferring the long line side parallel transmission control frame signal to the other one of said first and second intermediate terminals and for controlling said protection switch means and said transmitting-end/receiving-end means included in each of said drop/insertion offices.

15. A system as set forth in claim 14, wherein each of said terminal offices further comprises:
switching logic means for generating the long distance side parallel transmission control frame signal and the short distance side parallel transmission control frame signal, for receiving both of the long and short distance side parallel transmission control frame signals from the terminal office, and for controlling said transmitting-end/receiving-end means included in each of said drop/insertion offices.

16. A system as set forth in claim 15, wherein each of said switching logic units includes priority control means for receiving a priority signal and for selectively generating one of the long distance line side and short distance side parallel transmission control frame signals according to the priority signal.

17. A system as set forth in claim 16, wherein said priority control means comprises:
comparator means for receiving alarm signals given for each said long and first and second short distance lines;
long/short setting means, operatively connected to said comparator means, for storing memory flags, with a one to one correspondence to said long and first and second short distance lines, and for making said comparator produce at least one of a long distance line alarm and a short distance line alarm;
long/short priority decision means for providing the long line alarm or the short line alarm, when both of the long and short line alarms occur simultaneously, and for selecting one of the long and short line alarms according to the priority; and
switch means for specifying the priority.

* * * * *

UNITED STATES PATENT AND TRADEMARK OFFICE
CERTIFICATE OF CORRECTION

PATENT NO. : 5,263,017
DATED : November 16, 1993
INVENTOR(S) : Toshio NAKAJIMA et al.

It is certified that error appears in the above-identified patent and that said Letters Patent is hereby corrected as shown below:

<u>Title Page,</u>

Section [56], "U.S. PATENT DOCUMENTS", Col. 1, change "4,434,484" to --4,434,485--;

Section [56], "U.S. PATENT DOCUMENTS", Col. 2, change "Yoshimota et al." to --Yoshimoto et al.--; and Section [57], "ABSTRACT", line 13, delete "the" (first occurrence).

<u>Col. 2,</u> line 5, change "lines...are" to --lines are--.

<u>Col. 4,</u> line 20, after "therebetween" insert --.--; and
line 33, change "31" to --3'--.

<u>Col. 8,</u> line 9, change "1" to --$\ell$--.

<u>Col. 10,</u> line 11, delete "to" (third occurrence); and
line 12, change "→" to --to--.

<u>Col. 13,</u> line 21, change "6" to --60--.

UNITED STATES PATENT AND TRADEMARK OFFICE
CERTIFICATE OF CORRECTION

PATENT NO. : 5,263,017

DATED : November 16, 1993

INVENTOR(S) : Toshio NAKAJIMA et al.

It is certified that error appears in the above-identified patent and that said Letters Patent is hereby corrected as shown below:

<u>Col. 18</u>, line 40, after "means" insert --;--.

Signed and Sealed this

Twentieth Day of September, 1994

Attest:

BRUCE LEHMAN

*Attesting Officer*     *Commissioner of Patents and Trademarks*